US012639188B2

(12) United States Patent
Baillargeon

(10) Patent No.: US 12,639,188 B2
(45) Date of Patent: May 26, 2026

(54) TENANT RESOURCE OPTIMIZATION (TRO) IN CLOUDS

(71) Applicant: Telefonaktiebolaget LM Ericsson (publ), Stockholm (SE)

(72) Inventor: Steve Baillargeon, Toronto (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 912 days.

(21) Appl. No.: 17/794,452

(22) PCT Filed: Feb. 2, 2021

(86) PCT No.: PCT/IB2021/050834
§ 371 (c)(1),
(2) Date: Jul. 21, 2022

(87) PCT Pub. No.: WO2021/156745
PCT Pub. Date: Aug. 12, 2021

(65) Prior Publication Data
US 2023/0072358 A1     Mar. 9, 2023

Related U.S. Application Data

(60) Provisional application No. 62/971,324, filed on Feb. 7, 2020.

(51) Int. Cl.
*G06F 11/34*          (2006.01)
*G06F 9/50*           (2006.01)
(52) U.S. Cl.
CPC ........ *G06F 11/3409* (2013.01); *G06F 9/5033* (2013.01)

(58) Field of Classification Search
CPC ... G06F 11/3409; G06F 9/5033; G06F 9/5088
See application file for complete search history.

(56) References Cited

U.S. PATENT DOCUMENTS 5,781,703 A * 7/1998 Desai ...................... H04L 43/00
                                                 709/224
6,578,005 B1 * 6/2003 Lesaint .................. G06Q 10/06
                                                 705/7.14

(Continued)

OTHER PUBLICATIONS

International Search Report and Written Opinion dated Apr. 6, 2021 issued in PCT Application No. PCT/IB2021/050834, consisting of 16 pages.

(Continued)

*Primary Examiner* — Benjamin C Wu
(74) *Attorney, Agent, or Firm* — Sonoda & Kobayashi Intellectual Property Law; Sarvajit S. Patil

(57)                    ABSTRACT
A method of using a multi-cluster network is provided. The multi-cluster network has at least a plurality of clusters, where each cluster of the plurality of clusters has at least a node and a pod. The method includes collecting cluster and application information of the multi-cluster network. The cluster and application information includes at least a cluster capacity and an application performance metric. The application performance metric corresponds to at least an application. The method further includes analyzing the cluster and application information for a current pod arrangement on each cluster and adjusting at least the application performance metric based at least on the analyzed cluster and application information by taking at least a pod-based action achieving a new pod arrangement on a target cluster. An apparatus for using the multi-cluster network is also provided.

20 Claims, 16 Drawing Sheets

(56) References Cited

U.S. PATENT DOCUMENTS

| | | | | |
|---|---|---|---|---|
| 6,944,788 | B2* | 9/2005 | Dinker | G06F 11/2028 |
| | | | | 714/4.11 |
| 7,543,174 | B1* | 6/2009 | van Rietschote | G06F 11/2025 |
| | | | | 709/224 |
| 10,503,553 | B1 | 12/2019 | Ashok et al. | |
| 10,733,029 | B2* | 8/2020 | Kumar Shimoga Manjunatha | |
| | | | | H04L 41/5025 |
| 10,977,086 | B2* | 4/2021 | Jha | G06F 9/5077 |
| 11,038,986 | B1* | 6/2021 | Acar | H04L 67/34 |
| 11,119,800 | B1* | 9/2021 | Kowalski | G06F 11/3409 |
| 11,526,417 | B2* | 12/2022 | Savolainen | G06F 11/3419 |
| 11,800,335 | B2* | 10/2023 | Biswas | G06F 9/45558 |
| 2006/0031843 | A1* | 2/2006 | Romero | G06F 9/4806 |
| | | | | 718/104 |
| 2008/0320121 | A1* | 12/2008 | Altaf | H04L 67/1023 |
| | | | | 709/224 |
| 2012/0311138 | A1* | 12/2012 | Inamdar | H04L 43/04 |
| | | | | 709/224 |
| 2013/0198319 | A1* | 8/2013 | Shen | G06F 9/5077 |
| | | | | 718/1 |
| 2015/0378765 | A1* | 12/2015 | Singh | G06F 3/0482 |
| | | | | 718/1 |
| 2015/0381711 | A1* | 12/2015 | Singh | H04L 41/0897 |
| | | | | 709/221 |
| 2017/0373940 | A1 | 12/2017 | Shahab et al. | |
| 2018/0260125 | A1* | 9/2018 | Botes | G06F 11/2048 |
| 2018/0287956 | A1* | 10/2018 | Bryc | H04L 67/60 |
| 2018/0349199 | A1* | 12/2018 | Vyas | G06F 9/5061 |
| 2019/0038932 | A1* | 2/2019 | Eckblad | G06F 8/40 |
| 2019/0235906 | A1* | 8/2019 | Asawa | G06F 11/3433 |
| 2019/0312800 | A1* | 10/2019 | Schibler | H04L 41/16 |
| 2020/0042364 | A1* | 2/2020 | Kumar Shimoga Manjunatha | |
| | | | | G06F 9/5088 |
| 2020/0067778 | A1* | 2/2020 | Kothari | H04L 41/5025 |
| 2020/0151018 | A1* | 5/2020 | Jha | G06F 9/4856 |
| 2020/0364857 | A1* | 11/2020 | Moen | G06T 7/194 |
| 2021/0006637 | A1* | 1/2021 | Hilber | H04L 67/025 |
| 2021/0034423 | A1* | 2/2021 | Hallur | G06F 9/45558 |
| 2021/0081265 | A1* | 3/2021 | Mariyappa | G06F 9/5072 |
| 2021/0117217 | A1* | 4/2021 | Croteau | G06F 11/3409 |
| 2021/0149745 | A1* | 5/2021 | An | G06F 9/5083 |
| 2021/0157622 | A1* | 5/2021 | Ananthapur Bache | |
| | | | | H04L 41/122 |
| 2021/0157655 | A1* | 5/2021 | Foreman | G06F 9/5088 |
| 2021/0271521 | A1* | 9/2021 | Kang | H04L 41/082 |
| 2021/0279157 | A1* | 9/2021 | Woo | G06F 11/302 |
| 2022/0353201 | A1* | 11/2022 | Navali | H04L 41/5054 |
| 2023/0008011 | A1* | 1/2023 | Nair | H04L 47/726 |
| 2023/0072358 | A1* | 3/2023 | Baillargeon | G06F 9/5088 |
| 2024/0241770 | A1* | 7/2024 | Karve | G06F 9/505 |
| 2024/0311202 | A1* | 9/2024 | Battat | G06F 9/45558 |
| 2025/0117299 | A1* | 4/2025 | Jain | G06F 11/2048 |
| 2025/0165298 | A1* | 5/2025 | Beam | G06F 9/5027 |

OTHER PUBLICATIONS

Kaminski et al., A Framework for Black-Box SLO Tuning of Multi-Tenant Applications in Kubernetes; 2019 Association for Computing Machinery; Dec. 9, 2019, consisting of 6 pages.
https://github.com/kubernetes-sigs/descheduler web page; Jan. 16, 2020, consisting of 6 pages.
https://nfvwiki.etsi.org/index.php?title=NFV_FAQ web page; Jan. 16, 2020, consisting of 4 pages.

* cited by examiner

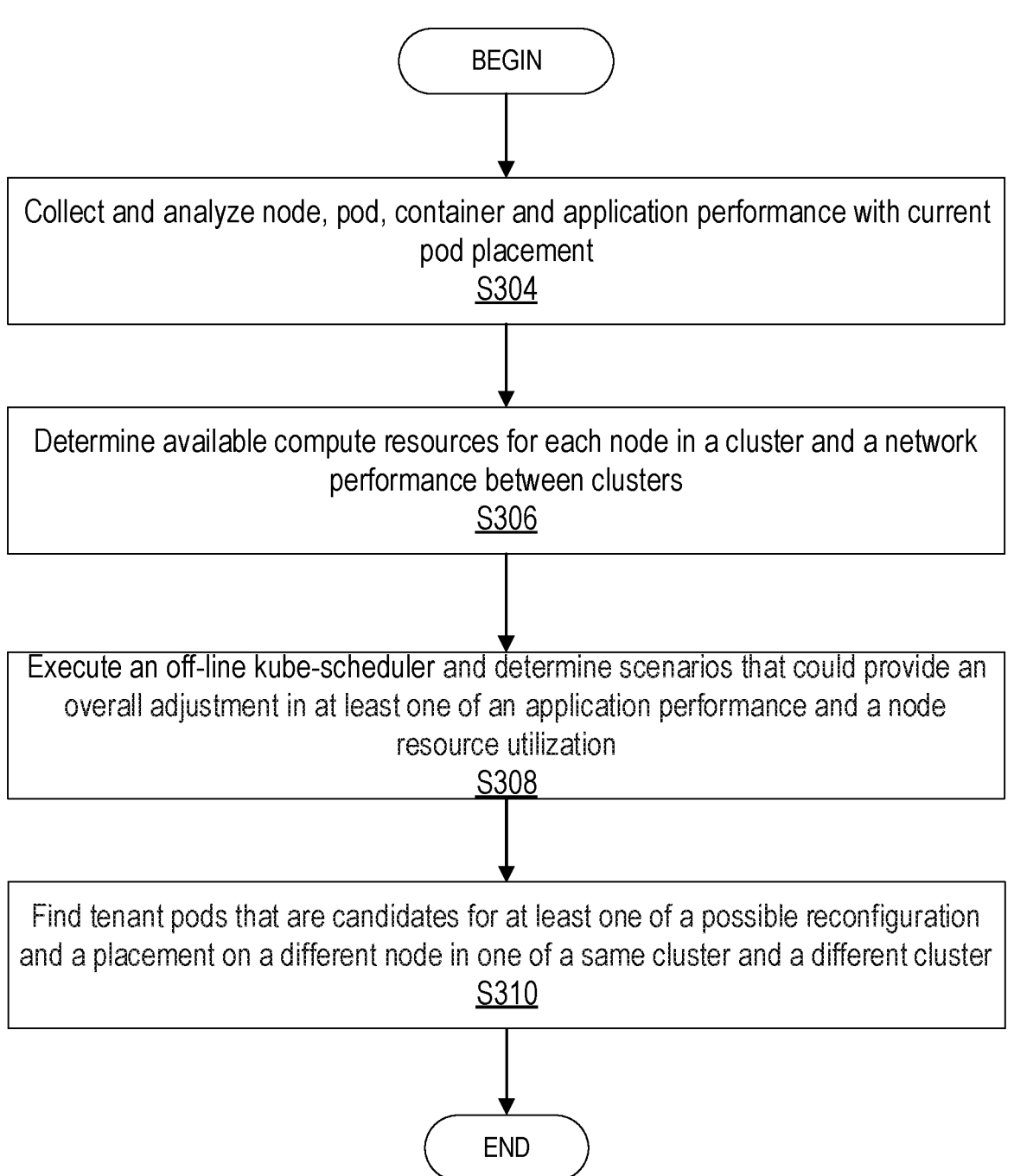

BEGIN

Collect and analyze node, pod, container and application performance with current pod placement
S304

Determine available compute resources for each node in a cluster and a network performance between clusters
S306

Execute an off-line kube-scheduler and determine scenarios that could provide an overall adjustment in at least one of an application performance and a node resource utilization
S308

Find tenant pods that are candidates for at least one of a possible reconfiguration and a placement on a different node in one of a same cluster and a different cluster
S310

END

FIG. 11

TENANT RESOURCE OPTIMIZATION (TRO) IN CLOUDS

CROSS-REFERENCE TO RELATED APPLICATIONS

This Application is a Submission Under 35 U.S.C. § 371 for U.S. National Stage Patent Application of International Application No.: PCT/IB2021/050834, filed Feb. 2, 2021 entitled "TENANT RESOURCE OPTIMIZATION (TRO) IN CLOUDS," which claims priority to U.S. Provisional Application No. 62/971,324, filed Feb. 7, 2020, entitled "TENANT RESOURCE OPTIMIZATION (TRO) METHOD, SYSTEM AND APPARATUS," the entireties of both of which are incorporated herein by reference.

TECHNICAL FIELD

Computer networks and computer application management and in particular, tenant resource optimization in multi-cluster environments.

BACKGROUND

Kubernetes (k8s) is a portable, extensible, open-source platform for managing containerized workloads and services, that facilitates both declarative configuration and automation. Kubernetes has a large, rapidly growing ecosystem. In addition, Kubernetes services, support, and tools are widely available.

Early on, organizations ran applications on physical servers. There was no way to define resource boundaries for applications in a physical server, and this caused resource allocation issues. For example, if multiple applications ran on a physical server, there could be instances where one application would take up most of the resources, and as a result, the other applications would underperform. A solution for this would be to run each application on a different physical server. However, running each application on a different physical server did not scale well as resources were underutilized. In addition, using different physical servers is expensive for organizations to maintain many physical servers.

As a solution, virtualization was introduced that allows for multiple Virtual Machines (VMs) to run on a single physical server's CPU. Virtualization allows applications to be isolated between VMs and provides a level of security as the information of one application cannot be freely accessed by another application.

Virtualization allows better utilization of resources in a physical server and allows better scalability because an application can be added or updated easily, reduces hardware costs, and much more. With virtualization, an operator could present a set of physical resources as a cluster of disposable virtual machines.

Each VM is a full machine running all the components, including the VM's own operating system, on top of virtualized hardware.

Containers are similar to VMs, but containers have relaxed isolation properties to share the Operating System (OS) among the applications. Therefore, containers are considered lightweight. Similar to a VM, a container has its own file system, CPU, memory, process space, and more. As containers are decoupled from the underlying infrastructure, the containers are portable across clouds and OS distributions.

Containers have become an efficient way to bundle and run applications. However, in a production environment, users need to manage the containers that run the applications and ensure that there is no downtime. For example, if a container goes down, another container needs to start.

Kubernetes provides a framework to run distributed systems resiliently. Kubernetes is a system for running thousands of containers in an automated, declarative, repeatable, and understandable way. In addition, Kubernetes provides a framework for deploying application code into production. From a Radio Access Network (RAN) developer perspective, Kubernetes provides tools to create powerful, production-ready applications to run on virtual machines or physical servers (i.e., workers or nodes). The RAN network performance now relies on a worker's Central Processing Unit (CPU) and/or Graphical Processing Unit (GPU) architecture, configuration and handling of workloads and tasks as well as how much virtualized compute resource and storage are allocated to individual RAN containerized applications.

A cluster consists of one or more master machines and multiple worker machines or nodes. A master runs control plane functions and coordinates between all nodes running actual workloads knowns as pods.

A pod is the smallest unit of deployment in a cluster, i.e., a pod is an instance of an application. A pod could run on a single container or multiple containers. Each pod has a unique Internet Protocol (IP) address assigned. If a pod is running on multiple containers, then the containers can communicate with each other using a localhost. When containers communicate outside the pod, the containers expose a port.

A node is a worker machine, a VM or a physical machine, which contains services to run pods. A node is controlled by a master which coordinates between all the nodes. Each node has knowledge of its CPU, GPU (if available), memory and maximum number of pods which can be scheduled on the node.

A tenant is a group of users responsible for creating and managing specific application instances, e.g., tenant pods, running in a multi-cluster network. For instance, a RAN operational team for a large operator of fifth generation technology standard for broadband cellular networks (5G) may have a tenant name called us-west-1 because the operator is managing RAN instances in the north part of the west coast in California, USA. The tenant is responsible for application lifecycle management including scaling and upgrading its applications.

An infra admin is a group of users responsible for creating and managing clusters and related physical components. For instance, an infra admin can be managing dozens of on-premises k8s clusters in a network. The tenant is responsible for the cluster lifecycle management including scaling and upgrading clusters, e.g., removing and/or adding a cluster and/or a new node to an existing cluster.

There currently exist certain challenge(s) associated with Kubernetes. One challenge involves the moving of a pod. Scheduling in Kubernetes is the process of binding pending pods to nodes and is performed by a component of Kubernetes called kube-scheduler, i.e., a default pod scheduler. The kube-scheduler runs locally on the master node of each cluster. The scheduler decisions, whether or where a pod can or cannot be scheduled, are guided by a configurable policy of the scheduler which comprises of set of rules. The scheduler decisions are also influenced by the scheduler's current view of the cluster when a new pod appears for the first time for scheduling.

As Kubernetes clusters are very dynamic and the state of the clusters change over time, there may be a desire to move already running pods to some other nodes for various reasons:

Some nodes are under or over-utilized. For instance, too many CPU intensive pods are running on the same node;

The original scheduling decision does not hold true anymore, as taints or labels are added to or removed from nodes, pod/node affinity requirements are not satisfied anymore;

Some nodes failed, and the pods associated with the failed nodes moved to other nodes;

New nodes are added to clusters;

Existing nodes have been upgraded or replaced with new nodes;

A new availability zone is added; and

An original container request and a limit are underestimated.

Consequently, because of dynamic environments, there might be several pods that are placed on less desirable nodes in a cluster or placed on several nodes in a cluster or across cluster that don't have equal load.

An additional challenge involves the descheduler function. The descheduler is a companion function that is mainly intended to find nodes that are underutilized and evicts pods, if possible, so that recreation of evicted pods is scheduled on underutilized nodes. The problems with the descheduler may include the following:

Descheduler runs as a job within a pod running on the same cluster and may take away precious resources away from the cluster capacity including resources from a master;

Only a single descheduler job per cluster is possible, meaning that the same descheduler policy is applicable for all pods and tenants in the cluster;

The descheduler policy/strategy (RemoveDuplicates, LowNodeUtilization, RemovePodsViolatingInterPodAntiAffinity, RemovePodsViolatingNodeAffinity) does not account for actual usage of the resources. In the case of LowNodeUtilization strategy, request resource requirements of pods (e.g., static values) are used as computing node resource "utilization," but resource allocation is not equal to resource utilization;

The descheduler policy may not satisfy the specific criteria of a tenant for possible placement on a new node. For instance, the descheduler evicts the best efforts pods before burstable and guaranteed pods, which may not be the desired objective for a tenant;

The descheduler is a tool designed for the infra admin to improve the overall usage and performance of a cluster. However, the descheduler does not necessarily improve the application performance of a specific tenant;

The descheduler does not have knowledge of the applications and related tasks and may have direct impact on application performance and traffic handling when a pod is evicted;

The descheduler does not have knowledge of the application Key Performance Indicators (KPIs) and may be evicting pods that are running fine from a tenant's point of view; and The descheduler is specific to a single cluster and does not account for available resources in other clusters.

An additional challenge is that European Telecommunications Standards Institute (ETSI) Network Functions Virtualization (NFV) did not define any functions, methods, or Lifecycle Management (LCM) operation for re-optimizing a Virtual Node Function (VNF) or Containerized Node Function (CNF) performance by a tenant. Heal VNF only provides corrective actions to repair a faulty VNF.

SUMMARY

Some embodiments advantageously provide methods and apparatuses for tenant resource optimization in multi-cluster environments.

According to one aspect, a method of using a multi-cluster network is provided. The multi-cluster network has at least a plurality of clusters, where each cluster of the plurality of clusters has at least a node and a pod. The method includes collecting cluster and application information of the multi-cluster network. The cluster and application information includes at least a cluster capacity and an application performance metric, where the application performance metric corresponds to at least an application. The method further includes analyzing the cluster and application information for a current pod arrangement on each cluster and adjusting at least the application performance metric based at least on the analyzed cluster and application information by taking at least a pod-based action achieving a new pod arrangement on a target cluster.

In some embodiments, the cluster capacity and application performance metric includes at least one of: (1) a cluster performance metric associated with nodes, pods, and volumes, each of the volumes corresponding to one pod; (2) radio access network, RAN, application key performance metrics, KPIs, including at least one of a number of connected users, a downlink cell volume, an uplink cell volume, an average user throughput, and a call setup delay; and (3) internet protocol, IP, throughput measurements. In some other embodiments, the multi-cluster network includes at least a first cluster and a second cluster, the first cluster including at least a first server and a first plurality of pods, the second cluster including a second server and a second plurality of pods.

In another embodiment, the first server includes at least any one of a first application programming interface, API, server and a first Prometheus server. The second server includes at least any one of a second application programming interface, API, server and a second Prometheus server. The first and second Prometheus servers being configured to at least collect and provide data including data associated with a cluster and a radio access network, RAN, performance and with a resource usage for the current pod arrangement. In one embodiment, collecting cluster and application information of the multi-cluster network further includes transmitting a first cluster resource audit request to the first server of the first cluster and receiving a first cluster resource audit response from the first server of the first cluster based at least on the first cluster resource audit request. The method further includes transmitting a second cluster resource audit request to the second server of the second cluster and receiving a second cluster resource audit response from the second server of the second cluster based at least on the second cluster resource audit request.

In some embodiments, collecting cluster and application information of the multi-cluster network further includes transmitting a first application key parameter indicator, KPI, request to one of the first server of the first cluster and a pod of the first plurality of pods and receiving a first application KPI response from one of the first server of the first cluster and the pod of the first plurality of pods based at least on the first application KPI request. The method further includes transmitting a second application key parameter indicator, KPI, request to one of the second server of the second cluster and a pod of the second plurality of pods and receiving a second application KPI response from one of the second server of the second cluster and the pod of the second plurality of pods based at least on the second application KPI request.

In another embodiment, collecting cluster and application information of the multi-cluster network further includes transmitting a first network KPI request to the pod of the first plurality of pods and receiving a first network KPI response from the pod of the first plurality of pods based at least on the first network KPI request. Collecting cluster and application information of the multi-cluster network further includes transmitting a second network KPI request to the pod of the second plurality of pods and receiving a second network KPI response from the pod of the second plurality of pods based at least on the second network KPI request.

In some other embodiments, transmitting the first network KPI requests includes performing a first network test from the pod of the first plurality of pods to the pod of the second plurality of pods and transmitting the second network KPI request includes performing a second network test from the pod of the second plurality of pods to the pod of the first plurality of pods.

In one embodiment, the pod of the first plurality of pods is one of a first pod of the first plurality of pods and a second pod of the first plurality of pods. The pod of the second plurality of pods is one of first pod of the second plurality of pods and a second pod of the second plurality of pods. The first pod of the first plurality of pods and the first pod of the second plurality of pods are associated with a first tenant. Further, the second pod of the first plurality of pods and the second pod of the second plurality of pods are associated with a second tenant.

In another embodiment, analyzing the cluster and application information further includes determining available compute resources for each node in each cluster of the multi-cluster network and a network performance between each cluster of the multi-cluster network, determining a reconfiguration scenario using at least an off-line scheduler to adjust at least one of the application performance metric and a node resource utilization, and determining at least a candidate pod for one of a possible reconfiguration and a placement of a pod on a different node. The different node is in one of a same cluster or in a different cluster. In some embodiments, the method further includes applying an inter-tenant resource policy and determining a priority for each change associated with a tenant based at least on the inter-tenant resource policy.

In some embodiments, adjusting at least the application performance metric further includes at least one of reconfiguring an existing pod, evicting the existing pod from a node where the existing pod runs, and instantiating a new pod. In some other embodiments, reconfiguring an existing pod further includes applying a new pod configuration to the existing pod to adjust at least a pod performance metric. In one embodiment, evicting the existing pod further includes performing a new pod deployment including updating, with a pod deployment template, a server of a cluster associated with the existing pod, creating a new pod, deleting the existing pod, and obtaining a deployment status corresponding to the pod deployment template.

In another embodiment, instantiating a new pod includes performing one of a new pod deployment and a scaled pod deployment in a cluster different from the cluster of the existing pod. Instantiating a new pod further includes obtaining a deployment status corresponding to one of the new pod deployment and the scaled pod deployment and performing one of deleting an existing deployment associated with the existing pod and scaling down the existing deployment associated with the existing pod.

In some embodiments, adjusting at least the application performance metric further includes performing rolling updates by incrementally updating pods with new pods. The new pods are scheduled on nodes with available compute resources. In some other embodiments, the method may be performed at least in part as one of a standalone network process, an integrated process as part of a virtual network function manager, VNFM, an integrated process as part of an open network automation platform, ONAP, and an integrated process as part of an open radio access network, O-RAN, near-real time radio intelligence controller, RIC, with an interface to clusters.

In another aspect, an apparatus for using a multi-cluster network is provided. The multi-cluster network has at least a plurality of clusters, where each cluster of the plurality of clusters has at least a node and a pod. The apparatus includes processing circuitry that is configured to collect cluster and application information of the multi-cluster network. The cluster and application information includes at least a cluster capacity and an application performance metric. The application performance metric corresponds to at least an application. The processing circuitry is further configured to analyze the cluster and application information for a current pod arrangement on each cluster and adjust at least the application performance metric based at least on the analyzed cluster and application information by taking at least a pod-based action achieving a new pod arrangement on a target cluster.

In some embodiments, the cluster capacity and application performance metric includes at least one of: (1) a cluster performance metric associated with nodes, pods, and volumes, each of the volumes corresponding to one pod; (2) radio access network, RAN, application key performance metrics, KPIs, including at least one of a number of connected users, a downlink cell volume, an uplink cell volume, an average user throughput, and a call setup delay; and (3) internet protocol, IP, throughput measurements. In some other embodiments, the multi-cluster network includes at least a first cluster and a second cluster, the first cluster including at least a first server and a first plurality of pods, the second cluster including a second server and a second plurality of pods.

In another embodiment, the first server includes at least any one of a first application programming interface, API, server and a first Prometheus server. The second server includes at least any one of a second application programming interface, API, server and a second Prometheus server. The first and second Prometheus servers being configured to at least collect and provide data including data associated with a cluster and a radio access network, RAN, performance and with a resource usage for the current pod arrangement. In one embodiment, collecting cluster and application information of the multi-cluster network further includes transmitting a first cluster resource audit request to the first server of the first cluster and receiving a first cluster resource audit response from the first server of the first cluster based at least on the first cluster resource audit request. Collecting cluster and application information of the multi-cluster network also includes transmitting a second cluster resource audit request to the second server of the second cluster and receiving a second cluster resource audit response from the second server of the second cluster based at least on the second cluster resource audit request.

In some embodiments, collecting cluster and application information of the multi-cluster network further includes transmitting a first application key parameter indicator, KPI, request to one of the first server of the first cluster and a pod of the first plurality of pods and receiving a first application KPI response from one of the first server of the first cluster and the pod of the first plurality of pods based at least on the first application KPI request. Collecting cluster and application information of the multi-cluster network also includes transmitting a second application key parameter indicator, KPI, request to one of the second server of the second cluster and a pod of the second plurality of pods and receiving a second application KPI response from one of the second server of the second cluster and the pod of the second plurality of pods based at least on the second application KPI request.

In another embodiment, collecting cluster and application information of the multi-cluster network further includes transmitting a first network KPI request to the pod of the first plurality of pods and receiving a first network KPI response from the pod of the first plurality of pods based at least on the first network KPI request. Collecting cluster and application information of the multi-cluster network further includes transmitting a second network KPI request to the pod of the second plurality of pods and receiving a second network KPI response from the pod of the second plurality of pods based at least on the second network KPI request.

In some other embodiments, transmitting the first network KPI requests includes performing a first network test from the pod of the first plurality of pods to the pod of the second plurality of pods and transmitting the second network KPI request includes performing a second network test from the pod of the second plurality of pods to the pod of the first plurality of pods.

In one embodiment, the pod of the first plurality of pods is one of a first pod of the first plurality of pods and a second pod of the first plurality of pods. The pod of the second plurality of pods is one of first pod of the second plurality of pods and a second pod of the second plurality of pods. The first pod of the first plurality of pods and the first pod of the second plurality of pods are associated with a first tenant. Further, the second pod of the first plurality of pods and the second pod of the second plurality of pods are associated with a second tenant.

In another embodiment, analyzing the cluster and application information further includes determining available compute resources for each node in each cluster of the multi-cluster network and a network performance between each cluster of the multi-cluster network, determining a reconfiguration scenario using at least an off-line scheduler to adjust at least one of the application performance metric and a node resource utilization, and determining at least a candidate pod for one of a possible reconfiguration and a placement of a pod on a different node. The different node is in one of a same cluster or in a different cluster. In some embodiments, the processing circuitry is further configured to apply an inter-tenant resource policy and determine a priority for each change associated with a tenant based at least on the inter-tenant resource policy.

In some embodiments, adjusting at least the application performance metric further includes at least one of reconfiguring an existing pod, evicting the existing pod from a node where the existing pod runs, and instantiating a new pod. In some other embodiments, reconfiguring an existing pod further includes applying a new pod configuration to the existing pod to adjust at least a pod performance metric. In one embodiment, evicting the existing pod further includes performing a new pod deployment including updating, with a pod deployment template, a server of a cluster associated with the existing pod, creating a new pod, deleting the existing pod, and obtaining a deployment status corresponding to the pod deployment template.

In another embodiment, instantiating a new pod includes performing one of a new pod deployment and a scaled pod deployment in a cluster different from the cluster of the existing pod. Instantiating a new pod further includes obtaining a deployment status corresponding to one of the new pod deployment and the scaled pod deployment and performing one of deleting an existing deployment associated with the existing pod and scaling down the existing deployment associated with the existing pod.

In some embodiments, adjusting at least the application performance metric further includes performing rolling updates by incrementally updating pods with new pods. The new pods are scheduled on nodes with available compute resources. In some other embodiments, the apparatus is further configured to operate as one of a standalone network device, part of a virtual network function manager, VNFM, part of an open network automation platform, ONAP, and part of an open radio access network, O-RAN, near-real time radio intelligence controller, RIC, with an interface to clusters.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 11 shows an example process performed in a cluster and application resource analysis phase when a TRO is dedicated to a single tenant according to the principles of the present disclosure;

DETAILED DESCRIPTION

Figure 1:
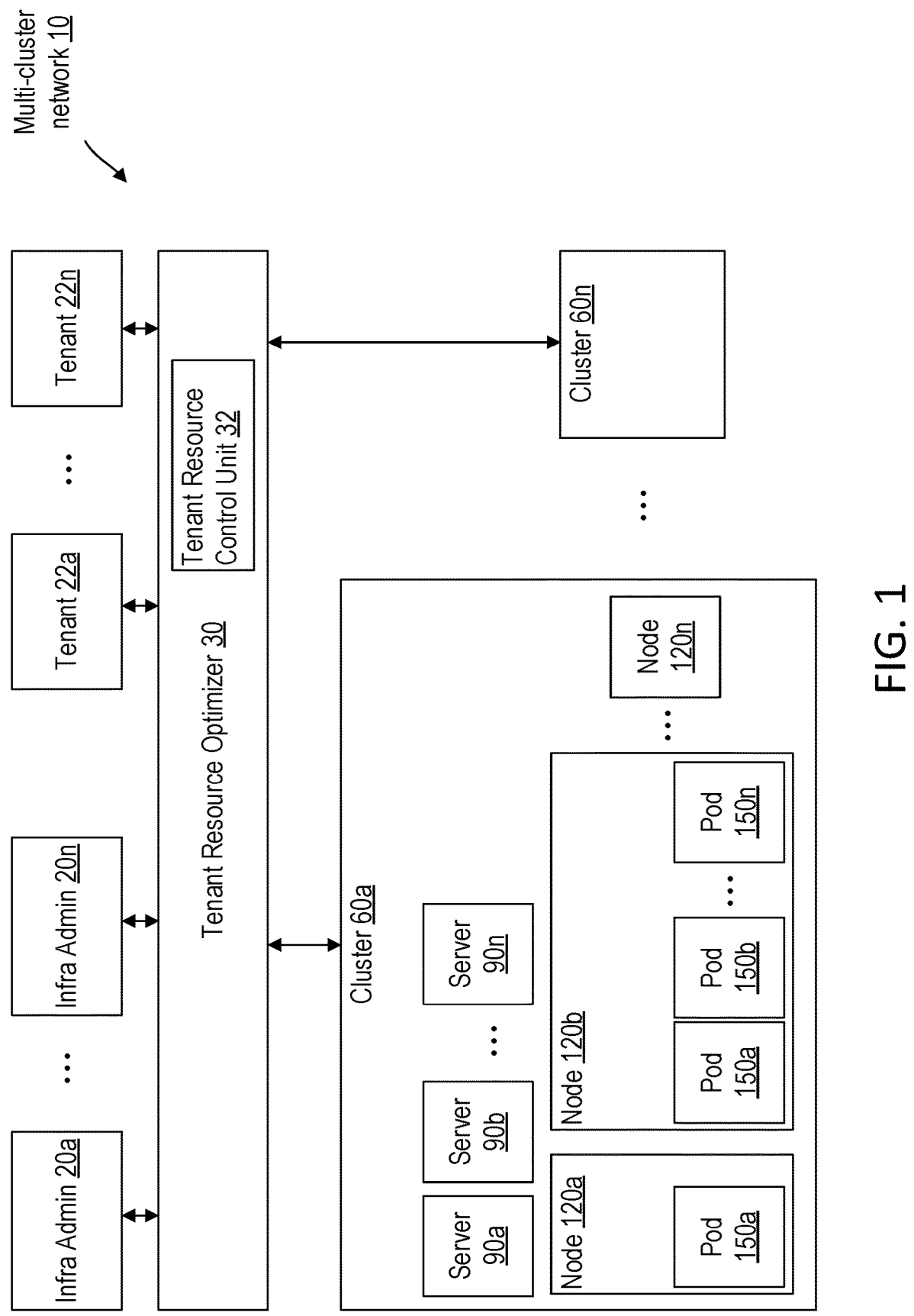
FIG. 1 is a schematic diagram of an example system such as a multi-cluster network according to the principles of the present disclosure.

Certain aspects of the present disclosure and their embodiments are directed toward a process called a tenant resource optimizer (TRO) that is responsible for analyzing performance of running applications and the capacity of the multi-cluster network in order to find pods belonging to a tenant that could benefit from re-configuration, re-scheduling in the same cluster or re-scheduling in a different cluster. The TRO is intended to continuously improve application performance of a specific tenant across the entire network made of multiple clusters by changing a size or a placement of pods in a controlled and prioritized fashion.

Some aspects disclose methods for a tenant to influence or control the placement of pod runtime instances across one or more clusters providing different resource capability and capacity over time to adjust the tenant application performance. Some embodiments may include discovering the capability and capacity of each cluster and application performance with current pod placement. Some other embodiments may include detecting improvement or degradation in application performance due to current pod placement and running an offline version of the intra-cluster pod scheduler to find pod instances that would benefit from re-configuration, re-scheduling in the same cluster, or re-scheduling in a different cluster. In some embodiments, using workload lifecycle operations may be provided for achieving new pod placement and/or configuration with application-layer preparation and post-optimization tasks to minimize impact on user sessions and user data delivery during changes.

Certain embodiments may provide one or more of the following with respect to the Kubernetes descheduler:

The TRO process may run on separate network or on a separate management cluster, outside the actual workload or application clusters;

A single TRO process may manage multiple clusters and handle cross-cluster resource optimization and workload placement;

Each tenant may have a dedicated TRO instance that is configured and intended to optimize tenant application performance, but not necessarily the cluster performance;

A tenant may configure an optimization policy to trigger eviction or re-configuration;

A tenant may not need to rely on assistance from infra admin to evict pods;

The TRO process complements a baseline application lifecycle operation process by interfacing the multi-cluster network without a need for special considerations or proprietary application programming interfaces (APIs) from underlying clusters;

The application performance of a tenant using TRO that is sharing cluster resources with other tenants may be expected to be higher than without the use of the TRO;

The TRO process may be used as standalone Lifecycle Manager (LCM) operation for optimizing the performance of existing VNF/CNF instances or can be used before triggering a VNF/CNF scaling operation or VNF instantiation operation;

The TRO process minimizes impact on user sessions and user data delivery during optimization changes;

TRO process may be capable to account for application key performance indicators to ensure eviction is based on degraded application performance due to underlying node/pod/container capacity;

The TRO process may be a management application that can run standalone or be integrated with a virtual network function manager (VNFM), NFV Network Functions Virtualization Orchestrator (NFVO), or an open network automation platform (ONAP) platform; and The TRO process provides a baseline definition for new ETSI NFV LCM operation called Optimize VNF.

Before describing in detail exemplary embodiments, it is noted that the embodiments reside primarily in combinations of apparatus components and processing steps related to tenant resource optimization. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some other embodiments, the term "adjusting" may be considered to indicate increasing or decreasing. In some embodiments, the term "dynamically adjusting" may be considered to indicate continuously and/or periodically adjusting.

In some embodiments, the term "allocation" may be considered to refer to an allocation of one or more resources, such as, for example, allocating computing resources.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for using a multi-cluster network which has at least a plurality of clusters, and each cluster of the plurality of clusters has at least a node and a pod.

Referring now to the drawing figures, in which like elements are referred to by like reference numerals, there is shown in FIG. 1 a schematic diagram of a multi-cluster network 10, such as a multi-cluster network, according to an embodiment, which comprises a plurality of infra admins 20a to 20n (referred to collectively as infra admins 20), a plurality of tenants 22a to 22n (referred to collectively as tenants 22), a Tenant Resource Optimizer 30, and a plurality of clusters 60a to 60n (referred to collectively as clusters 60). A cluster 60 may comprise a plurality of servers 90a to 90n (referred to collectively as servers 90). In addition, a cluster 60 may comprise a plurality of nodes 120a to 120n (referred to collectively as nodes 120) and may comprise a plurality of pods 150-150n (referred to collectively as pods 150). The pods 150 may be comprised in any of the nodes 120 and/or servers 90.

A Tenant Resource Optimizer 30 is configured to include a tenant resource control unit 32 which is configured for using a multi-cluster network which has at least a plurality of clusters, and each cluster of the plurality of clusters has at least a node and a pod. In addition, Tenant Resource Optimizer 30 may be in communication with any of the elements of multi-cluster network 10, including but not limited to being in communication with infra admin 20, tenant 22, cluster 60, server 90, and/or node 120. Server 90 may include, but is not limited to, an API server and/or a Prometheus server.

Example implementations, in accordance with an embodiment, of the multi-cluster network 10 discussed in the preceding paragraphs will now be described with reference to FIG. 2.

The multi-cluster network 10 further includes a Tenant Resource Optimizer 30 provided in a multi-cluster network 10 and including hardware 40 enabling it to communicate with any of the elements of multi-cluster network 10, including but not limited to being in communication with infra admin 20, tenant 22, cluster 60, server 90, and/or node 120. The hardware 40 may include a communication interface 42 for setting up and maintaining a wired or wireless connection with an interface of a different communication device of the multi-cluster network 10, such as connection 160 with cluster 60, connection 162 with node 120, and/or connection 164 with server 90. The communication interface 42 may be formed as or may include, for example, one or more RF transmitters, one or more RF receivers, and/or one or more RF transceivers.

In the embodiment shown, the hardware 40 of the Tenant Resource Optimizer 30 further includes processing circuitry 44. The processing circuitry 44 may include a processor 46 and a memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the Tenant Resource Optimizer 30 further has software 50 stored internally in, for example, memory 48, or stored in external memory (e.g., database, storage array, network storage device, etc.) accessible by the Tenant Resource Optimizer 30 via an external connection. The software 50 may be executable by the processing circuitry 44. The software 50 may include a client application 52. The client application 52 may be operable to provide a service to a human or non-human user via the Tenant Resource Optimizer 30. The client application 58 may interact with the user to generate the user data that it provides. The processing circuitry 44 may be configured to control any of the methods and/or processes described herein and/or to cause such methods, and/or processes to be performed, e.g., by Tenant Resource Optimizer 30. Processor 46 corresponds to one or more processors 46 for performing Tenant Resource Optimizer 30 functions described herein. The memory 48 is configured to store data, programmatic software code and/or other information described herein. In some embodiments, the software 50 may include instructions that, when executed by the processor 46 and/or processing circuitry 44, causes the processor 46 and/or processing circuitry 44 to perform the processes described herein with respect to Tenant Resource Optimizer 30. For example, processing circuitry 44 of the Tenant Resource Optimizer 30 may include tenant resource control unit 32 configured to perform Tenant Resource Optimizer methods discussed herein, such as the methods discussed with reference to FIG. 3 as well as other figures.

Multi-cluster network 10 further includes a cluster 60 provided in a multi-cluster network 10 and including hardware 70 enabling it to communicate with any of the elements of multi-cluster network 10, including but not limited to being in communication with Tenant Resource Optimizer 30, server 90, and/or node 120. The hardware 70 may include a communication interface 72 for setting up and maintaining a wired or wireless connection with an interface of a different communication device of the multi-cluster network 10, such as connection 160 with Tenant Resource Optimizer 30. The communication interface 72 may be formed as or may include, for example, one or more RF transmitters, one or more RF receivers, and/or one or more RF transceivers.

In the embodiment shown, the hardware 70 of the cluster 60 further includes processing circuitry 74. The processing circuitry 74 may include a processor 76 and a memory 78. In particular, in addition to or instead of a processor, such as a central processing unit, and memory, the processing circuitry 74 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 76 may be configured to access (e.g., write to and/or read from) the memory 78, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the cluster 60 further has software 80 stored internally in, for example, memory 78, or stored in external memory (e.g., database, storage array, network storage device, etc.) accessible by the cluster 60 via an external connection. The software 80 may be executable by the processing circuitry 74. The processing circuitry 74 may be configured to control any of the methods and/or processes described herein and/or to cause such methods, and/or processes to be performed, e.g., by cluster 60. Processor 76 corresponds to one or more processors 76 for performing cluster 60 functions described herein. The memory 78 is configured to store data, programmatic software code and/or other information described herein. In some embodiments, the software 80 may include instructions that, when executed by the processor 76 and/or processing circuitry 74, causes the processor 76 and/or processing circuitry 74 to perform the processes described herein with respect to cluster 60.

Multi-cluster network 10 further includes a server 90 provided in a multi-cluster network 10 and including hardware 100 enabling it to communicate with any of the elements of multi-cluster network 10, including but not limited to being in communication with Tenant Resource Optimizer 30, cluster 60, and/or node 120. The hardware 100 may include a communication interface 102 for setting up and maintaining a wired or wireless connection with an interface of a different communication device of the multi-cluster network 10, such as connection 164 with Tenant Resource Optimizer 30. The communication interface 102 may be formed as or may include, for example, one or more RF transmitters, one or more RF receivers, and/or one or more RF transceivers.

In the embodiment shown, the hardware 100 of the server 900 further includes processing circuitry 104. The processing circuitry 104 may include a processor 106 and a memory 108. In particular, in addition to or instead of a processor, such as a central processing unit, and memory, the processing circuitry 104 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 106 may be configured to access (e.g., write to and/or read from) the memory 108, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the server 90 further has software 110 stored internally in, for example, memory 108, or stored in external memory (e.g., database, storage array, network storage device, etc.) accessible by the server 90 via an external connection. The software 110 may be executable by the processing circuitry 104. The processing circuitry 104 may be configured to control any of the methods and/or processes described herein and/or to cause such methods, and/or processes to be performed, e.g., by server 90. Processor 106 corresponds to one or more processors 106 for performing server 90 functions described herein. The memory 108 is configured to store data, programmatic software code and/or other information described herein. In some embodiments, the software 110 may include instructions that, when executed by the processor 106 and/or processing circuitry 104, causes the processor 106 and/or processing circuitry 104 to perform the processes described herein with respect to server 90.

Multi-cluster network 10 further includes a node 120 provided in a multi-cluster network 10 and including hardware 130 enabling it to communicate with any of the elements of multi-cluster network 10, including but not limited to being in communication with Tenant Resource Optimizer 30, cluster 60, and/or server 90. The hardware 130 may include a communication interface 132 for setting up and maintaining a wired or wireless connection with an interface of a different communication device of the multi-cluster network 10, such as connection 162 with Tenant Resource Optimizer 30. The communication interface 132 may be formed as or may include, for example, one or more RF transmitters, one or more RF receivers, and/or one or more RF transceivers.

In the embodiment shown, the hardware 130 of the node 120 further includes processing circuitry 134. The processing circuitry 134 may include a processor 136 and a memory 138. In particular, in addition to or instead of a processor, such as a central processing unit, and memory, the processing circuitry 134 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 136 may be configured to access (e.g., write to and/or read from) the memory 138, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the node 120 further has software 140 stored internally in, for example, memory 108, or stored in external memory (e.g., database, storage array, network storage device, etc.) accessible by the node 120 via an external connection. The software 140 may be executable by the processing circuitry 134. The processing circuitry 134 may be configured to control any of the methods and/or processes described herein and/or to cause such methods, and/or processes to be performed, e.g., by node 120. Processor 136 corresponds to one or more processors 136 for performing node 120 functions described herein. The memory 138 is configured to store data, programmatic software code and/or other information described herein. In some embodiments, the software 140 may include instructions that, when executed by the processor 136 and/or processing circuitry 134, causes the processor 136 and/or processing circuitry 134 to perform the processes described herein with respect to node 120. Node 120 further comprises pod 150. However, multi-cluster network 10 is not limited to pod 150 being comprised in node 120. In a nonlimiting example, pod 150 may be comprised in cluster 60 and/or server 90.

Server 90 may perform the functions of a master and/or the functions of node 120 described herein. Alternatively, node 120 may perform the functions of a master and/or the functions of server 90 described herein.

Figure 2:
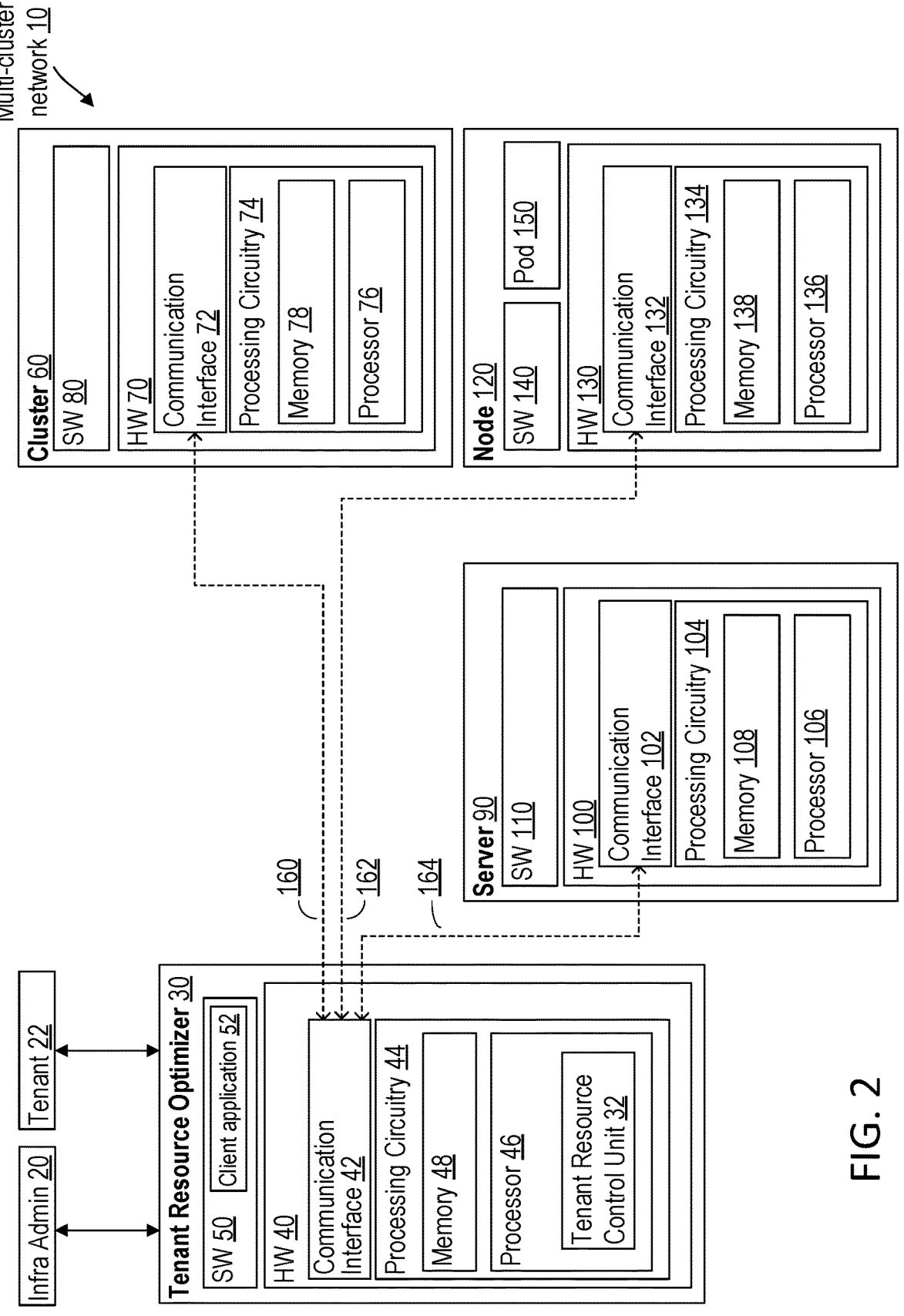
FIG. 2 is a block diagram of a tenant resource optimizer in communication with a cluster, a server and a node according to the principles of the present disclosure.

Although FIGS. 1 and 2 show the tenant resource unit 32 as being within a processor, it is contemplated that this unit may be implemented such that a portion of the unit is stored in a corresponding memory within the processing circuitry. In other words, the units may be implemented in hardware or in a combination of hardware and software within the processing circuitry.

Figure 3:
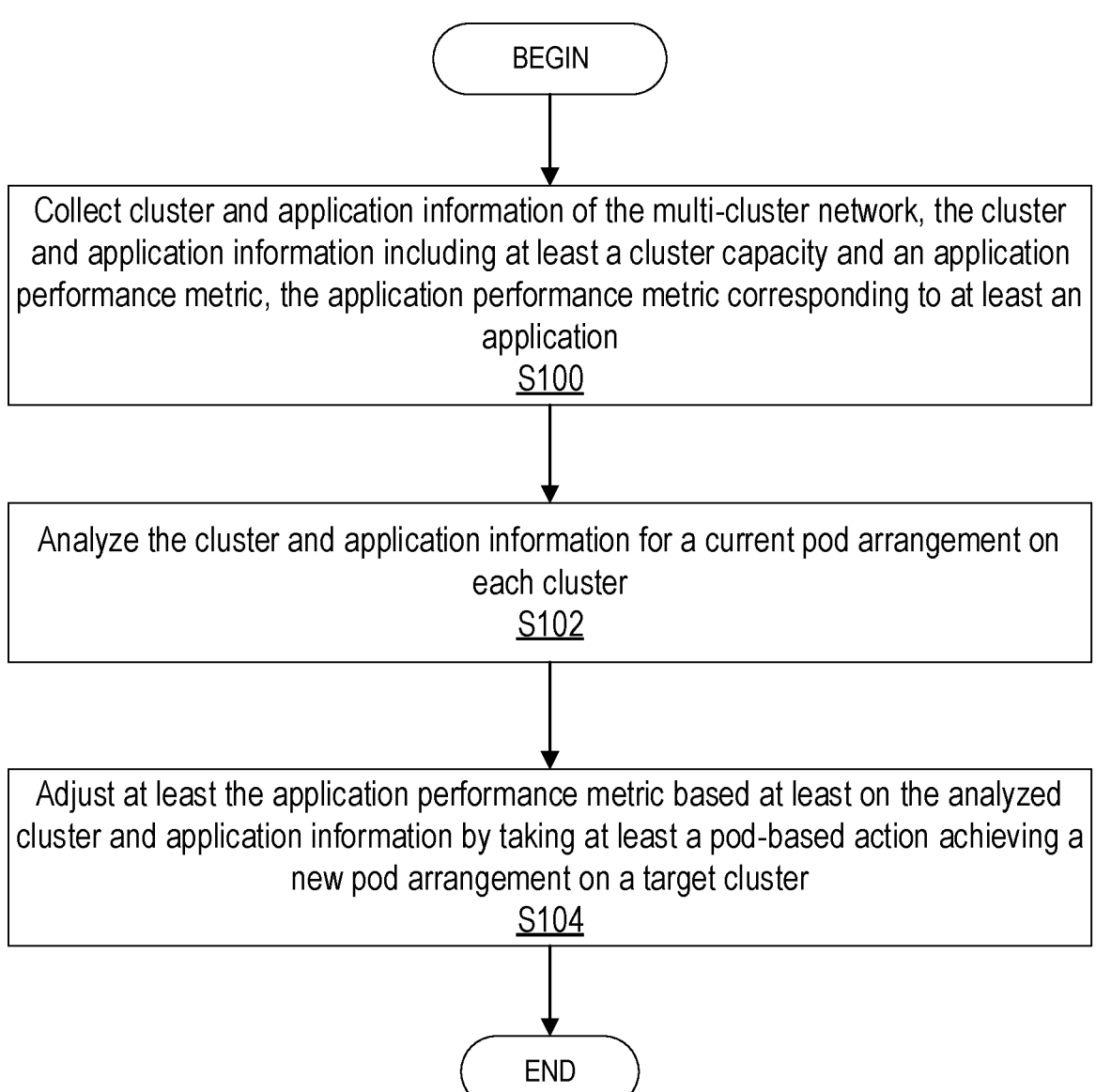
FIG. 3 is a flowchart of an example process in an apparatus according to some embodiments of the present disclosure.

FIG. 3 is a flowchart of an example process in a Tenant Resource Optimizer 30 for an apparatus, such as a tenant resource optimizer, for using a multi-cluster network, the multi-cluster network having at least a plurality of clusters, each cluster of the plurality of clusters having at least a node and a pod. One or more Blocks and/or functions and/or methods performed by the Tenant Resource Optimizer 30 may be performed by one or more elements of Tenant Resource Optimizer 30 such as via tenant resource control unit 32 in processing circuitry 44, processor 46, communication interface 42, etc. according to the example method. The example method includes colleting (Block S100), such as via tenant resource control unit 32 in processing circuitry 44, processor 46, communication interface 42, cluster and application information of the multi-cluster network 10, the cluster and application information including at least a cluster capacity and an application performance metric, the application performance metric corresponding to at least an application. The method further includes, analyzing (Block S102), such as via tenant resource control unit 32 in processing circuitry 44, processor 46, communication interface 42, the cluster and application information for a current pod arrangement on each cluster 60. In addition, the example method includes, adjusting (Block S104), such as via tenant resource control unit 32 in processing circuitry 44, processor 46, communication interface 42, at least the application performance metric based at least on the analyzed cluster and application information by taking at least a pod-based action achieving a new pod arrangement on a target cluster 60.

In some embodiments, the cluster capacity and application performance metric includes at least one of: (1) a cluster performance metric associated with nodes 120, pods 150, and volumes, each of the volumes corresponding to one pod 150; (2) radio access network, RAN, application key performance metrics, KPIs, including at least one of a number of connected users, a downlink cell volume, an uplink cell volume, an average user throughput, and a call setup delay; and (3) internet protocol, IP, throughput measurements. In some other embodiments, the multi-cluster network 10 includes at least a first cluster 60a and a second cluster 60n, the first cluster 60a including at least a first server 90a and a first plurality of pods, the second cluster 60n including a second server 90n and a second plurality of pods.

In another embodiment, the first server 90a includes at least any one of a first application programming interface, API, server and a first Prometheus server. The second server 90n includes at least any one of a second application programming interface, API, server and a second Prometheus server. The first and second Prometheus servers being configured to at least collect and provide data including data associated with a cluster and a radio access network, RAN, performance and with a resource usage for the current pod arrangement. In one embodiment, collecting cluster and application information of the multi-cluster network further includes transmitting a first cluster resource audit request to the first server 90a of the first cluster 60a and receiving a first cluster resource audit response from the first server 90a of the first cluster 60a based at least on the first cluster resource audit request. The method further includes transmitting a second cluster resource audit request to the second server 90n of the second cluster 60n and receiving a second cluster resource audit response from the second server 90n of the second cluster 60n based at least on the second cluster resource audit request.

In some embodiments, collecting cluster and application information of the multi-cluster network 10 further includes transmitting a first application key parameter indicator, KPI, request to one of the first server 90a of the first cluster 60a and a pod of the first plurality of pods and receiving a first application KPI response from one of the first server 90a of the first cluster 60a and the pod of the first plurality of pods based at least on the first application KPI request. The method further includes transmitting a second application key parameter indicator, KPI, request to one of the second server 90n of the second cluster 60n and a pod of the second plurality of pods and receiving a second application KPI response from one of the second server 90n of the second cluster 60n and the pod of the second plurality of pods based at least on the second application KPI request.

In another embodiment, collecting cluster and application information of the multi-cluster network further includes transmitting a first network KPI request to the pod of the first plurality of pods and receiving a first network KPI response from the pod of the first plurality of pods based at least on the first network KPI request. Collecting cluster and application information of the multi-cluster network 10 further includes transmitting a second network KPI request to the pod of the second plurality of pods and receiving a second network KPI response from the pod of the second plurality of pods based at least on the second network KPI request.

In some other embodiments, transmitting the first network KPI requests includes performing a first network test from the pod of the first plurality of pods to the pod of the second plurality of pods and transmitting the second network KPI request includes performing a second network test from the pod of the second plurality of pods to the pod of the first plurality of pods.

In one embodiment, the pod of the first plurality of pods is one of a first pod 150a1 of the first plurality of pods and a second pod 150b1 of the first plurality of pods. The pod of the second plurality of pods is one of first pod 150an of the second plurality of pods and a second pod 150bn of the second plurality of pods. The first pod 150a1 of the first plurality of pods and the first pod 150an of the second plurality of pods are associated with a first tenant 22a. Further, the second pod 150b1 of the first plurality of pods and the second pod 150bn of the second plurality of pods are associated with a second tenant 22b.

In another embodiment, analyzing the cluster and application information further includes determining available compute resources for each node 120 in each cluster 60 of the multi-cluster network 10 and a network performance between each cluster 60 of the multi-cluster network 10, determining a reconfiguration scenario using at least an off-line scheduler to adjust at least one of the application performance metric and a node resource utilization, and determining at least a candidate pod for one of a possible reconfiguration and a placement of a pod 150a on a different node 120*b*. The different node 120*b* is in one of a same cluster 60*a* or in a different cluster 60*b*. In some embodiments, the method further includes applying an inter-tenant resource policy and determining a priority for each change associated with a tenant based at least on the inter-tenant resource policy.

In some embodiments, adjusting at least the application performance metric further includes at least one of reconfiguring an existing pod 150*a*1, evicting the existing pod 150*a*1 from a node where the existing pod 150*a*1 runs, and instantiating a new pod 150*a*3. In some other embodiments, reconfiguring an existing pod 150*a*1 further includes applying a new pod configuration to the existing pod 150*a*1 to adjust at least a pod performance metric. In one embodiment, evicting the existing pod 150*a*1 further includes performing a new pod deployment including updating, with a pod deployment template, an server 90*a* of a cluster 60*a* associated with the existing pod 150*a*1, creating a new pod 150*a*3, deleting the existing pod 150*a*1, and obtaining a deployment status corresponding to the new pod deployment template.

In another embodiment, instantiating a new pod 150*a*3 includes performing one of a new pod deployment and a scaled pod deployment in a cluster 60*n* different from the cluster 60*a* of the existing pod 150*a*1. Instantiating a new pod further includes obtaining a deployment status corresponding to one of the new pod deployment and the scaled pod deployment and performing one of deleting an existing deployment associated with the existing pod 150*a*1 and scaling down the existing deployment associated with the existing pod 150*a*1.

In some embodiments, adjusting at least the application performance metric further includes performing rolling updates by incrementally updating pods 150 with new pods 150. The new pods 150 are scheduled on nodes 120 with available compute resources. In some other embodiments, the method may be performed at least in part as one of a standalone network process, an integrated process as part of a virtual network function manager, VNFM, an integrated process as part of an open network automation platform, ONAP, and an integrated process as part of an open radio access network, O-RAN, near-real time radio intelligence controller, RIC, with an interface to clusters 60.

Having described the general process flow of arrangements of the disclosure and having provided examples of hardware and software arrangements for implementing the processes and functions of the disclosure, the sections below provide details and examples of arrangements for tenant resource optimization, which may be implemented by Tenant Resource Optimizer 30 and/or cluster 60, server 90, node 120. Some embodiments provide one or more techniques for tenant resource optimization.

Figure 4:
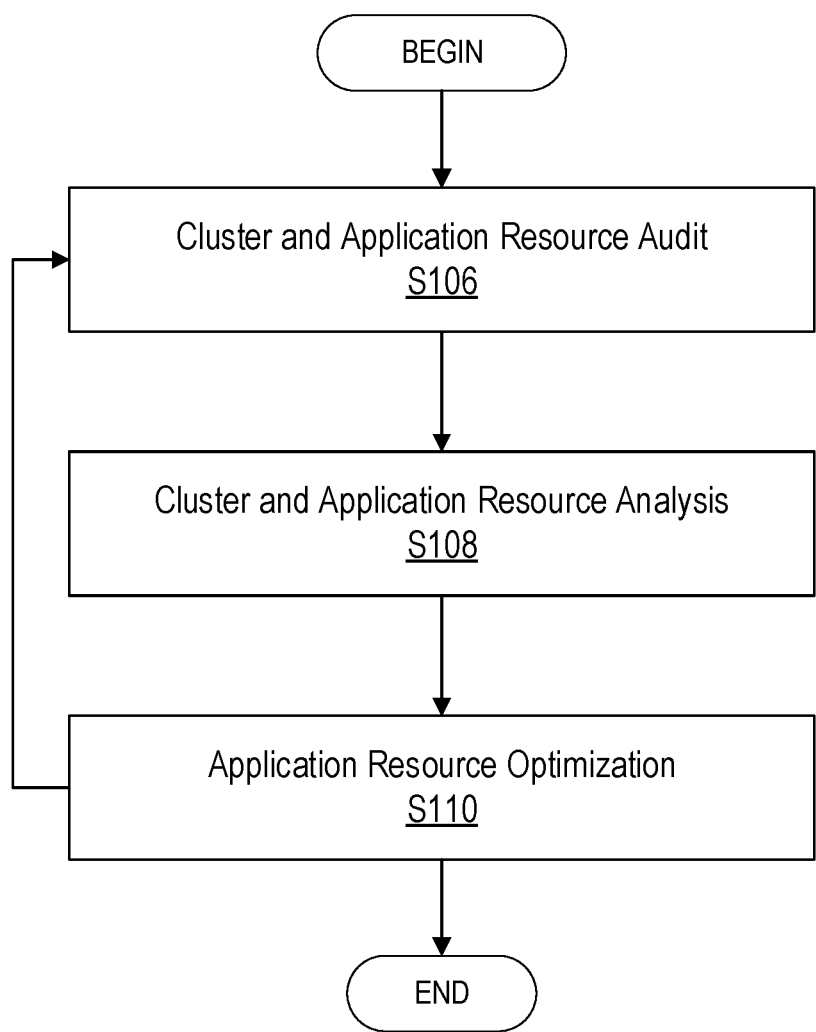
FIG. 4 a flowchart of an example process for tenant resource optimization according to some embodiments of the present disclosure.

FIG. 4 shows an example process for tenant resource optimization according to the principles of the present disclosure. The example process begins with the cluster and application resource audit phase (Block S106). When the cluster and application resource audit is completed, such as via tenant resource control unit 32 in processing circuitry 44, processor 46, communication interface 42, the process moves to the cluster and application resource analysis phase (Block S108). When the analysis is finished, such as via tenant resource control unit 32 in processing circuitry 44, processor 46, communication interface 42, the process moves to the application resource optimization phase (Block S110). When changes have been successfully applied, such as via tenant resource control unit 32 in processing circuitry 44, processor 46, communication interface 42, to the cluster(s) and related tenant pods, the process either stops or repeats its cycle with the 3 phases starting with the audit phase (Block S106).

In this embodiment, a one-time cycle is defined as a manual application optimization. The repeated cycle is defined as an automatic application optimization, e.g., auto-optimization. The rate at which each new cycle is automatically started is user configurable, e.g., a predefined rate.

In the cluster and app resource audit phase (Block S106), the tenant resource optimization process discovers and collects cluster capacity and application performance information in a multi-cluster network including collecting configuration and performance data about nodes, tenant pods with current placement in each cluster and application-layer performance indicators as well as triggering network performance tests, e.g., delay tests, bandwidth tests, between tenant pods in different clusters.

Figure 5:
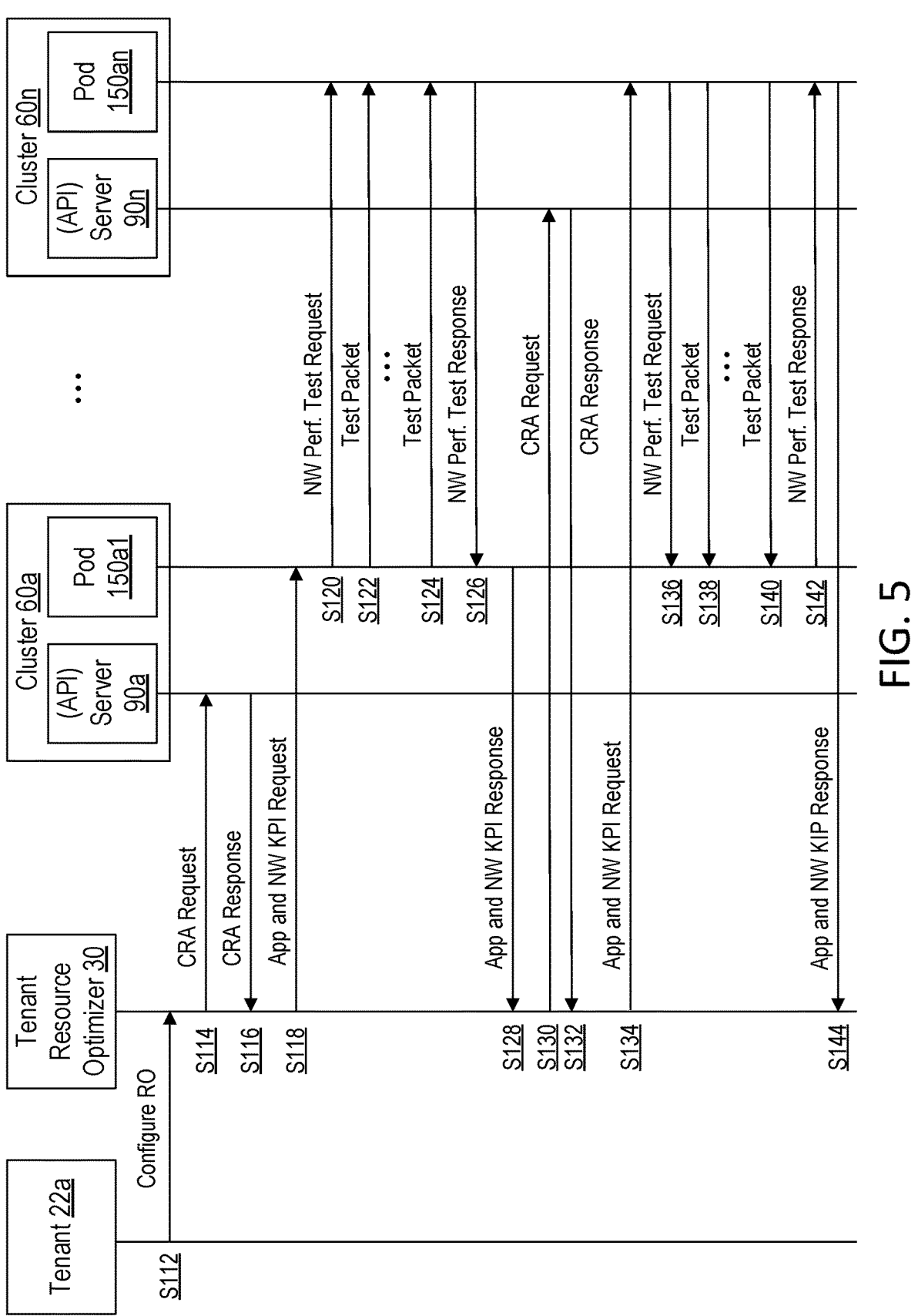
FIG. 5 illustrates an example process performed in a cluster and application resource audit phase when a tenant resource optimizer is dedicated to a single tenant according to the principles of the present disclosure.

FIG. 5 illustrates an example process performed in the cluster and application resource audit phase (Block S106, as shown in FIG. 4) when a tenant resource optimizer is dedicated to a single tenant according to the principles of the present disclosure. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120. In this example, pod 150*a*1 and pod 150*an* are pods 150 that belong to tenant 22*a*. In other words, a pod 150 that belongs to or is associated with a tenant A, such as tenant 22*a*, may have a plurality of pods 150*a*, such as a pod 150*a*1, a pod 150*b*1, a pod 150*c*1, to a predetermined number n of pods 150*a*, such as 150*an*.

At step S112, tenant 22*a* configures resource optimizer TRO 30 with a configuration including an audit phase configuration. At step S114, TRO 30 transmits a cluster resource audit (CRA) request to Server 90*a*, e.g., a first API server, in cluster 60*a*, and, at step S116, the Server 90*a* transmits a CRA response to TRO 30. At step S118, TRO 30 transmits a request for application and network KPI to pod 150*a*1 in cluster 60*a*. At step S120, pod 150*a*1 transmits a network performance test request to pod 150*an* in cluster 60*n*. At step S122 a test packet, e.g., an iPerf test, is transmitted from pod 150*a*1 to pod 150*an*. In some embodiments, an iPerf test performs active measurements of associated with bandwidth on IP networks. Multiple test packets may be transmitted similar to the test packet transmitted at step S122. At step S124, another test packet, e.g., an iPerf test, is transmitted from pod 150*a*1 to pod 150*an*. At step S126, pod 150*an* transmits a network performance test response to pod 150*a*1. Then, at step S128, pod 150*a*1 transmits an application and network KPI response to TRO 30.

At step S130, TRO 30 transmits a CRA request to Server 90*n*, e.g., a second API server, in cluster 60*n*, and, at step S132, the Server 90*n* transmits a CRA response to TRO 30. At step S134, TRO 30 transmits a request for application and network KPI to pod 150*an* in cluster 60*n*. At step S136, pod 150*an* transmits a network performance test request to pod 150*a*1 in cluster 60*a*. At step S138 a test packet, e.g., an iPerf test, is transmitted from pod 150*an* to pod 150*a*1. Multiple test packets may be transmitted similar to the test packet transmitted at step S138. At step S140 another test packet, e.g., an iPerf test, is transmitted from pod 150*an* to pod 150a1. At step S142, pod 150a1 transmits a network performance test response to pod 150an. Then, at step S144, pod 150an transmits an application and network KPI response to TRO 30.

Figure 6:
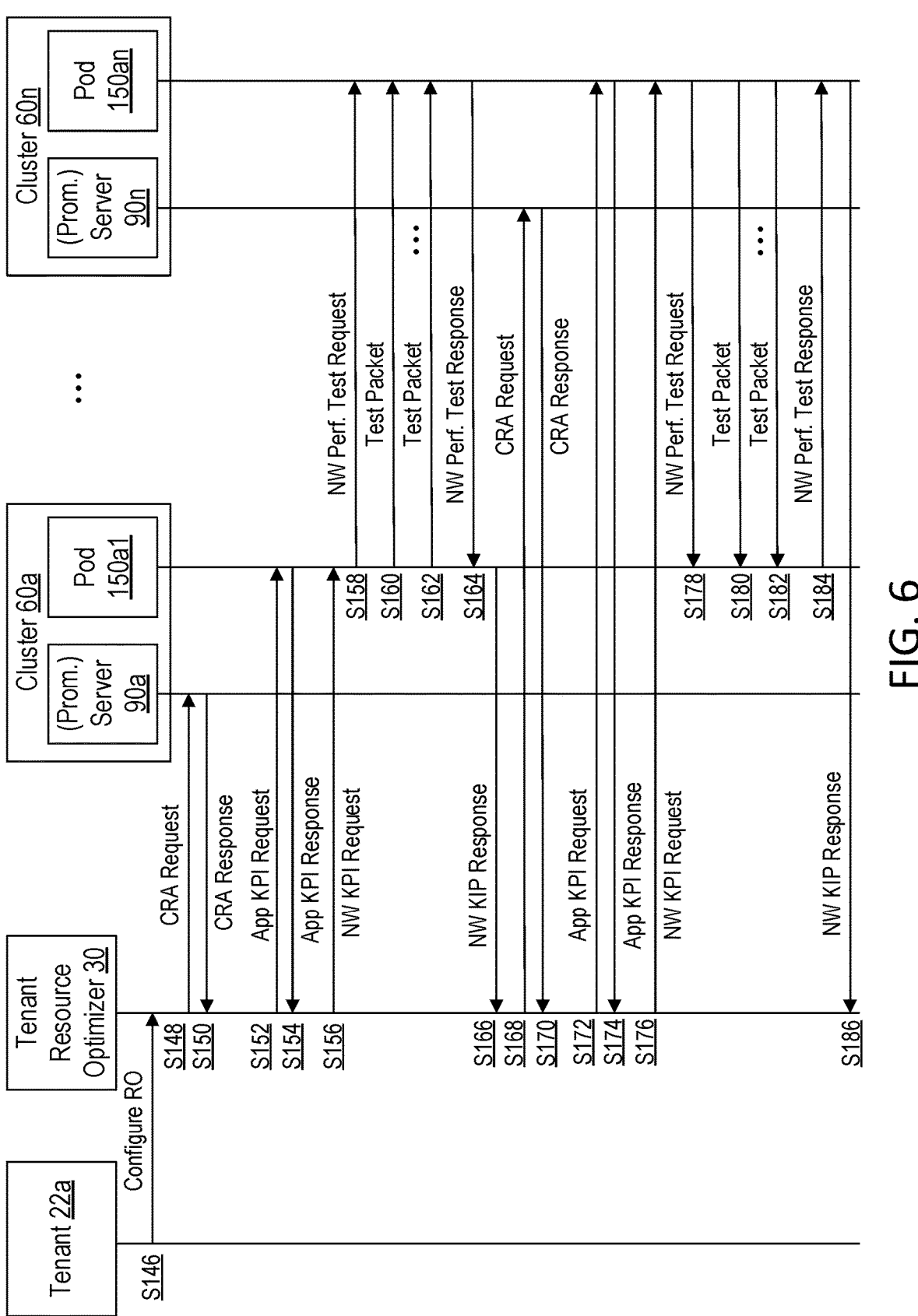
FIG. 6 illustrates another example process performed in a cluster and application resource audit phase including a server, such as a Prometheus server, when a tenant resource optimizer is dedicated to a single tenant according to the principles of the present disclosure.

FIG. 6 illustrates another an example process performed in the cluster and application resource audit phase including a server, such as a Prometheus server, when a tenant resource optimizer is dedicated to a single tenant according to the principles of the present disclosure. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120. In this example, pod 150a1 and pod 150an are pods 150 that belong to tenant 22a, and the application KPI requests/responses are separated from the network KPI requests/responses.

At step S146, tenant 22a configures resource optimizer TRO 30 with a configuration including an audit phase configuration. At step S148, TRO 30 transmits a CRA request to Server 90a, e.g., a first Prometheus server, in cluster 60a, and, at step S150, the Server 90a transmits a CRA response to TRO 30. At step S152, TRO 30 transmits a request for application KPI to pod 150a1 in cluster 60a. At step S154, pod 150a1 transmits an application KPI response to TRO 30. At step S156, TRO 30 transmits a request for network KPI to pod 150a1 in cluster 60a. At step S158, pod 150a1 transmits a network performance test request to pod 150an in cluster 60n. At step S160 a test packet, e.g., an iPerf test, is transmitted from pod 150a1 to pod 150an. In some embodiments, an iPerf test performs active measurements of associated with bandwidth on IP networks. Multiple test packets may be transmitted similar to the test packet transmitted at step S160. At step S162, another test packet, e.g., an iPerf test, is transmitted from pod 150a1 to pod 150an. At step S164, pod 150an transmits a network performance test response to pod 150a1. Then, at step S166, pod 150a1 transmits a network KPI response to TRO 30.

At step S168, TRO 30 transmits a CRA request to Server 90n, e.g., a second Prometheus server, in cluster 60n, and, at step S170, the Server 90n transmits a CRA response to TRO 30. At step S172, TRO 30 transmits a request for application KPI to pod 150an in cluster 60n. At step S174, pod 150an transmits an application KPI response to TRO 30. At step S176, TRO 30 transmits a network KPI request to pod 150an. At step S178, pod 150an transmits a network performance test request to pod 150a1 in cluster 60a. At step S180 a test packet, e.g., an iPerf test, is transmitted from pod 150an to pod 150a1. Multiple test packets may be transmitted similar to the test packet transmitted at step S180. At step S182 another test packet, e.g., an iPerf test, is transmitted from pod 150an to pod 150a1. At step S184, pod 150a1 transmits a network performance test response to pod 150an. Then, at step S186, pod 150an transmits a network KPI response to TRO 30.

Figure 7:
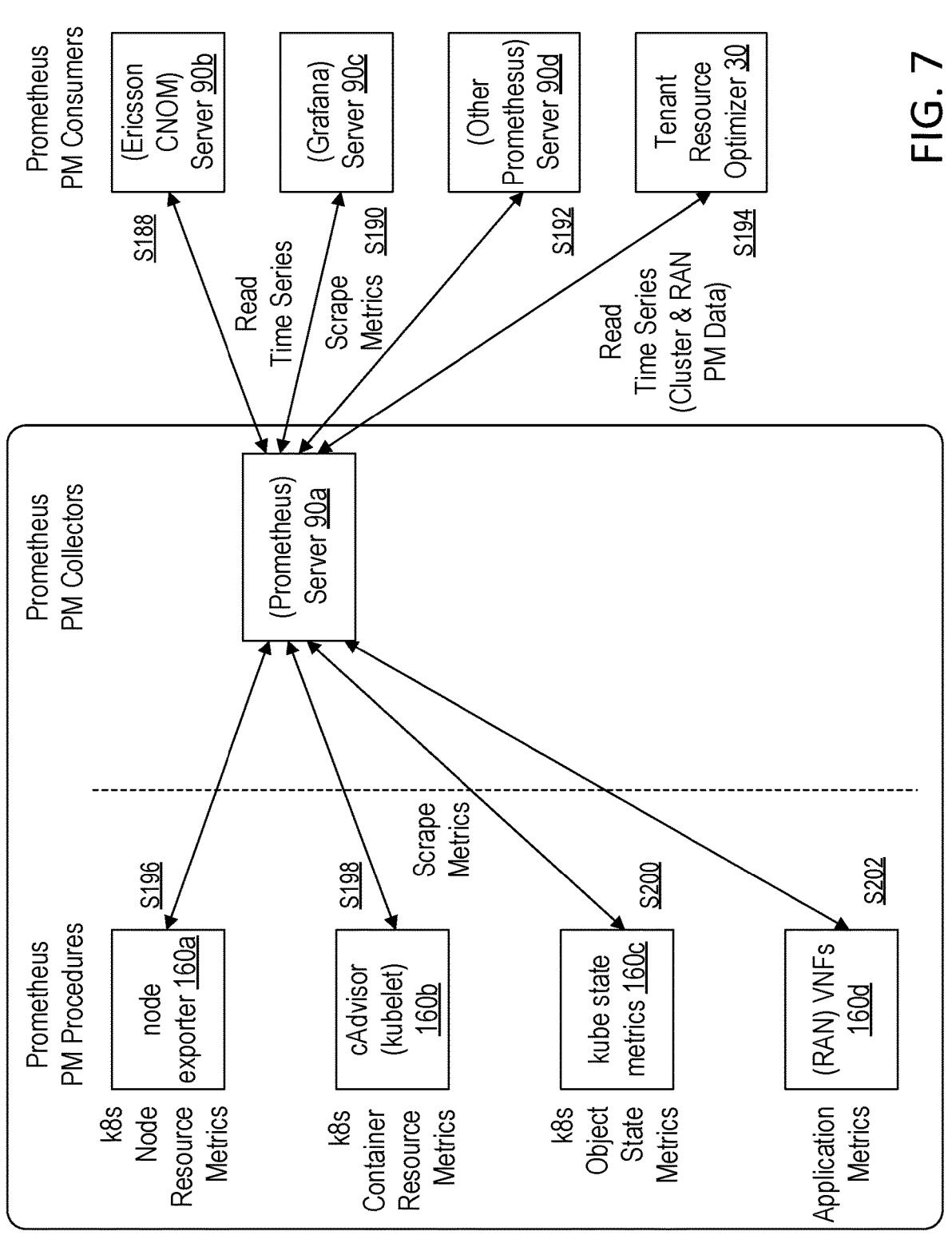
FIG. 7 shows an example system including a server, such as a Prometheus server, and an example process according to the principles of the present disclosure.

FIG. 7 shows an example system including a server, such as a Prometheus server, according to the principles of the present disclosure. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120.

A Prometheus Performance Management (PM) Collector, such as server 90a, may be queried by Prometheus PM consumers. Prometheus consumers may include servers 90, such as a server 90b running Core Network Operations Manager (CNOM), which may read time series at step S188, server 90c running a Grafana application, e.g., querying to read scrape metrics at step S190, other servers 90d, such as Prometheus servers, that may query server 90a at step S192. Prometheus consumers may also include TRO 30, which may query for time series, e.g., cluster and RAN PM data, at step S194.

Server 90a may obtain various Prometheus PM procedures, e.g., metrics and/or scrape metrics that may include k8s node resource metrics, k8s container resource metrics, k8s object state metrics, and application metrics. More specifically, at step S194, server 90a may query node exporter 160a to obtain node resource metrics, such as k8s node resource metrics. At step S198, server 90a may query cAdvisor (kubelet) 160b to obtain container resource metrics, such as k8s container resource metrics. At step S200, server 90a may query kube state metrics 160c to obtain object state metrics, such as k8s object state metrics. At step S202, server 90a may query (RAN) VNFs 160d to obtain application metrics.

Figure 8:
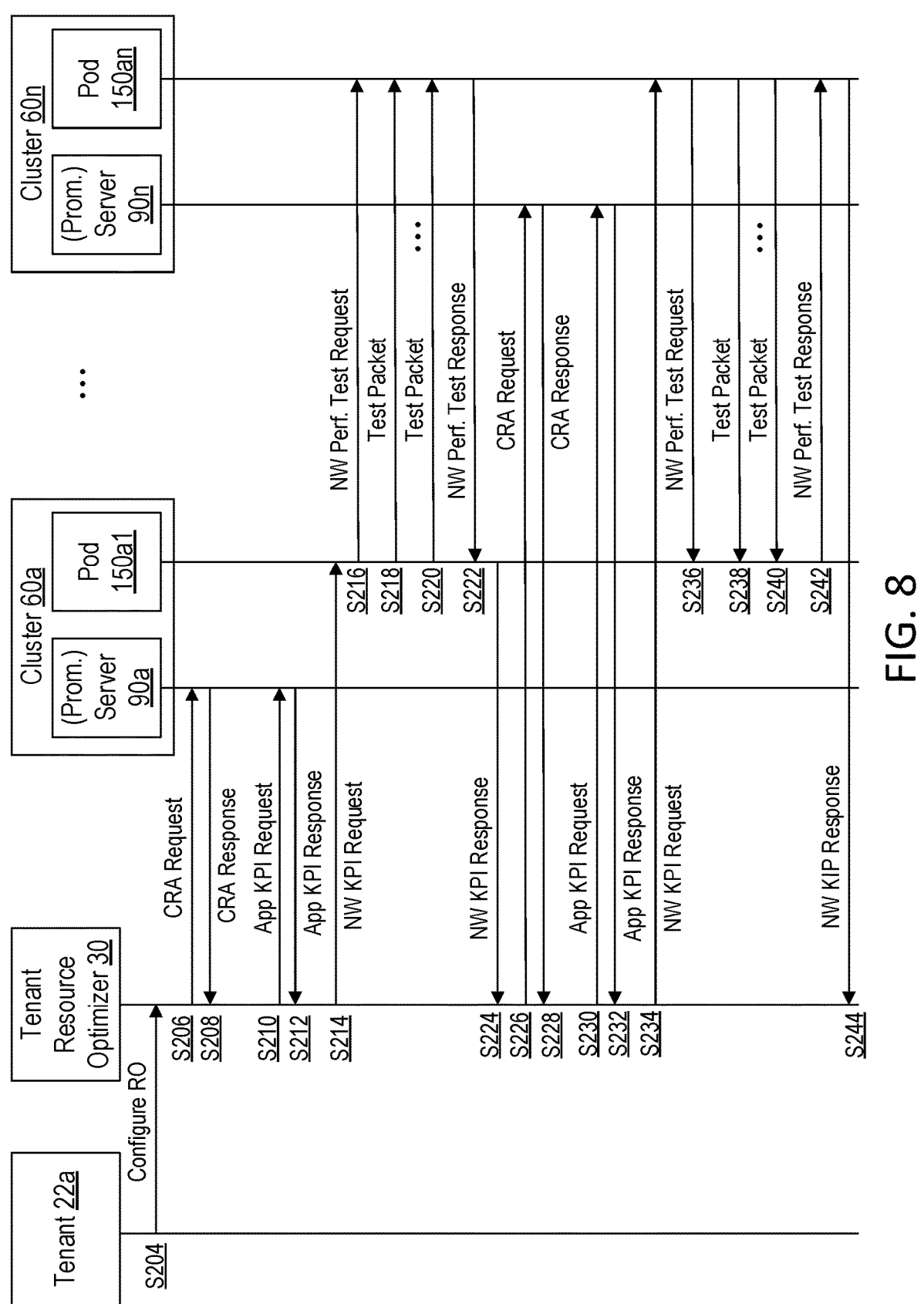
FIG. 8 illustrates another example of a process performed in a cluster and application resource audit phase including a server, such as a Prometheus server, queried for application KPI according to the principles of the present disclosure.

FIG. 8 illustrates another an example process performed in the cluster and application resource audit phase including a server, such as a Prometheus server, queried for application KPI according to the principles of the present disclosure. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120. At step S204, tenant 22a configures resource optimizer TRO 30 with a configuration including an audit phase configuration. At step S206, TRO 30 transmits a CRA request to Server 90a, e.g., a first Prometheus server, in cluster 60a, and, at step S208, the Server 90a transmits a CRA response to TRO 30. At step S210, TRO 30 transmits a request for application KPI to server 90a in cluster 60a. At step S212, server 90a transmits an application KPI response to TRO 30. At step S214, TRO 30 transmits a request for network KPI to pod 150a1 in cluster 60a. At step S216, pod 150a1 transmits a network performance test request to pod 150an in cluster 60n. At step S218 a test packet, e.g., an iPerf test, is transmitted from pod 150a1 to pod 150an. Multiple test packets may be transmitted similar to the test packet transmitted at step S218. At step S220, another test packet, e.g., an iPerf test, is transmitted from pod 150a1 to pod 150an. At step S222, pod 150an transmits a network performance test response to pod 150a1. Then, at step S224, pod 150a1 transmits a network KPI response to TRO 30.

At step S226, TRO 30 transmits a CRA request to Server 90n in cluster 60n, and, at step S228, Server 90n, e.g., a second Prometheus server, transmits a CRA response to TRO 30. At step S230, TRO 30 transmits a request for application KPI to server 90n in cluster 60n. At step S232, server 90n transmits an application KPI response to TRO 30. At step S234, TRO 30 transmits a network KPI request to pod 150an. At step S236, pod 150an transmits a network performance test request to pod 150*a*1 in cluster 60*a*. At step S238 a test packet, e.g., an iPerf test, is transmitted from pod 150*an* to pod 150*a*1. Multiple test packets may be transmitted similar to the test packet transmitted at step S238. At step S240 another test packet, e.g., an iPerf test, is transmitted from pod 150*an* to pod 150*a*1. At step S242, pod 150*a*1 transmits a network performance test response to pod 150*an*. Then, at step S244, pod 150*an* transmits a network KPI response to TRO 30.

Figure 9:
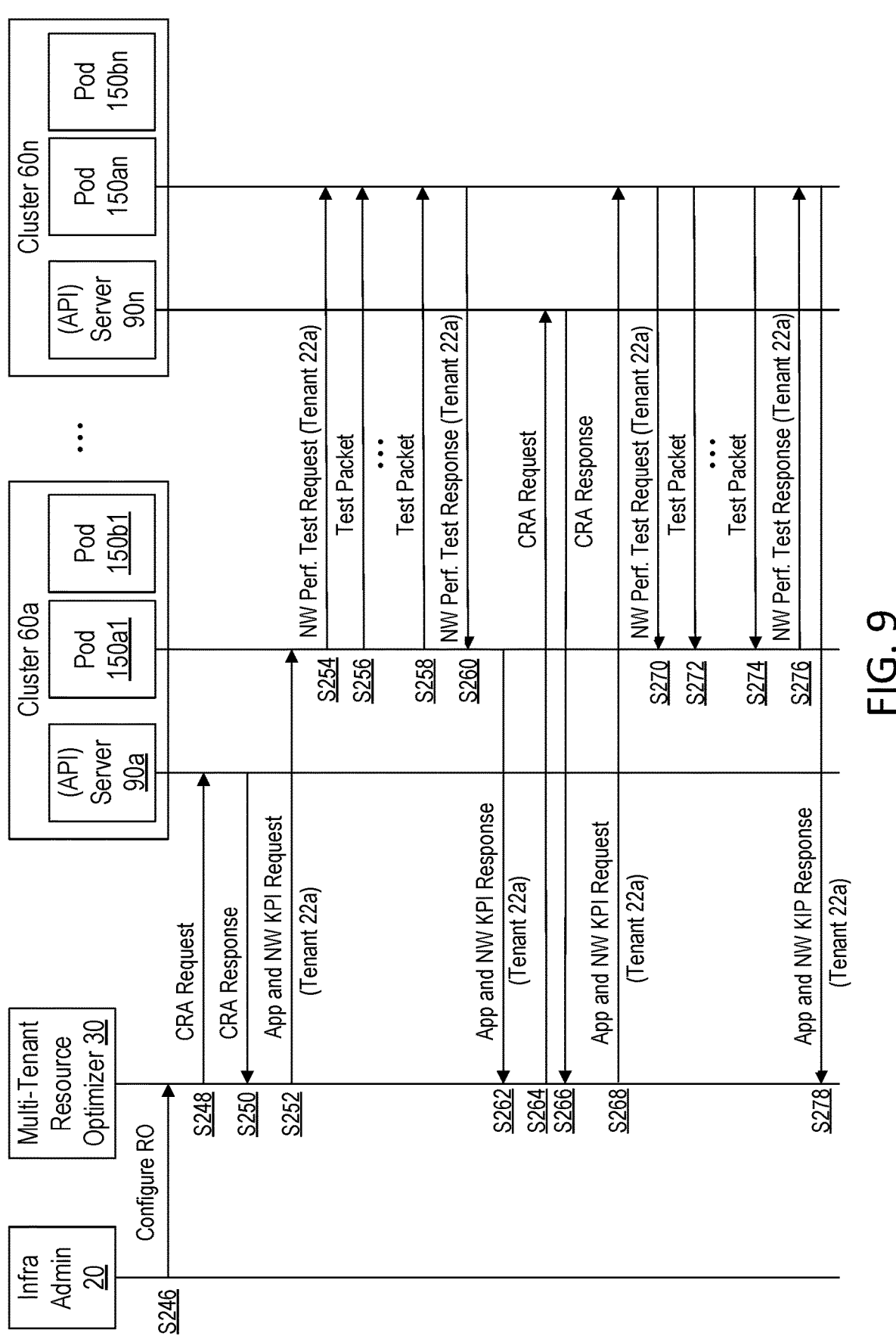
FIG. 9 illustrates an example process performed in a cluster and application resource audit phase including a multi-tenant TRO managed by an infra administrator for a tenant according to the principles of the present disclosure.

FIG. 9 illustrates an example process performed in the cluster and application resource audit phase including a multi-tenant TRO managed by an infra administrator for a tenant according to the principles of the present disclosure. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120. In this example, pod 150*a*1 and pod 150*an* are pods 150 that belong to tenant 22*a*. In other words, a pod 150 that belongs to or is associated with a tenant A, such as tenant 22*a*, may have a plurality of pods 150*a*, such as a pod 150*a*1, a pod 150*b*1, a pod 150*c*1, to a predetermined number n of pods 150*a*, such as 150*an*. Similarly, tenant pods 150*b*1 and 150*bn* are pods 150 that belong to a tenant B, such as tenant 22*b*.

At step S246, infra admin 20 configures resource optimizer TRO 30 with a configuration including an audit phase configuration. At step S248, TRO 30 transmits a CRA request to Server 90*a*, e.g., a first API server, in cluster 60*a*, and, at step S250, the Server 90*a* transmits a CRA response to TRO 30. At step S252, TRO 30 transmits a request for application and network KPI to pod 150*a*1 in cluster 60*a*. At step S254, pod 150*a*1 transmits a network performance test request to pod 150*an* in cluster 60*n*. At step S256 a test packet, e.g., an iPerf test, is transmitted from pod 150*a*1 to pod 150*an*. Multiple test packets may be transmitted similar to the test packet transmitted at step S256. At step S258, another test packet, e.g., an iPerf test, is transmitted from pod 150*a*1 to pod 150*an*. At step S260, pod 150*an* transmits a network performance test response to pod 150*a*1. Then, at step S262, pod 150*a*1 transmits an application and network KPI response to TRO 30.

At step S264, TRO 30 transmits a CRA request to Server 90*n*, e.g., a second API server, in cluster 60*n*, and, at step S266, the Server 90*n* transmits a CRA response to TRO 30. At step S268, TRO 30 transmits a request for application and network KPI to pod 150*an* in cluster 60*n*. At step S270, pod 150*an* transmits a network performance test request to pod 150*a*1 in cluster 60*a*. At step S272 a test packet, e.g., an iPerf test, is transmitted from pod 150*an* to pod 150*a*1. Multiple test packets may be transmitted similar to the test packet transmitted at step S272. At step S274 another test packet, e.g., an iPerf test, is transmitted from pod 150*an* to pod 150*a*1. At step S276, pod 150*a*1 transmits a network performance test response to pod 150*an*. Then, at step S278, pod 150*an* transmits an application and network KPI response to TRO 30.

Figure 10:
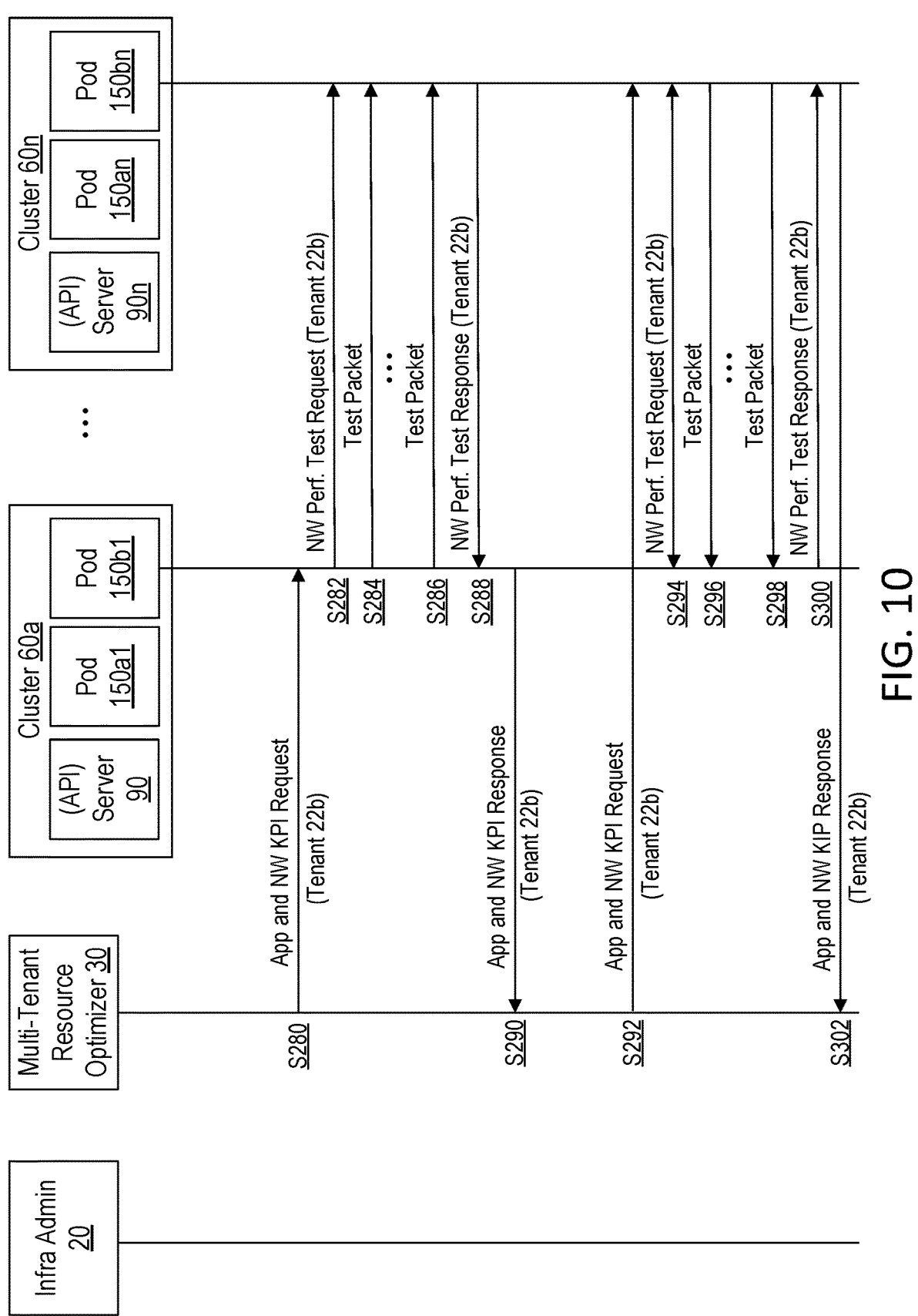
FIG. 10 illustrates an example process performed in a cluster and application resource audit phase including a multi-tenant TRO managed by an infra administrator for another tenant according to the principles of the present disclosure.

FIG. 10 illustrates an example process performed in the cluster and application resource audit phase including a multi-tenant TRO managed by an infra administrator for another tenant according to the principles of the present disclosure. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120. In this example, pod 150*a*1 and pod 150*an* are pods 150 that belong to tenant 22*a*. In other words, a pod 150 that belongs to or is associated with a tenant A, such as tenant 22*a*, may have a plurality of pods 150*a*, such as a pod 150*a*1, a pod 150*b*1, a pod 150*c*1, to a predetermined number n of pods 150*a*, such as 150*an*. Similarly, tenant pods 150*b*1 and 150*bn* are pods 150 that belong to a tenant B, such as tenant 22*b*.

At step S280, TRO 30 transmits a request for application and network KPI to pod 150*b*1 in cluster 60*a*. At step S282, pod 150*b*1 transmits a network performance test request to pod 150*bn* in cluster 60*n*. At step S284 a test packet, e.g., an iPerf test, is transmitted from pod 150*b*1 to pod 150*bn*. Multiple test packets may be transmitted similar to the test packet transmitted at step S284. At step S286, another test packet, e.g., an iPerf test, is transmitted from pod 150*b*1 to pod 150*bn*. At step 288, pod 150*bn* transmits a network performance test response to pod 150*b*1. Then, at step S290, pod 150*b*1 transmits an application and network KPI response to TRO 30.

At step S292, TRO 30 transmits a request for application and network KPI to pod 150*bn* in cluster 60*n*. At step S294, pod 150*bn* transmits a network performance test request to pod 150*b*1 in cluster 60*a*. At step S296, a test packet, e.g., an iPerf test, is transmitted from pod 150*bn* to pod 150*b*1. Multiple test packets may be transmitted similar to the test packet transmitted at step S296. At step S298 another test packet, e.g., an iPerf test, is transmitted from pod 150*bn* to pod 150*b*1. At step S300, pod 150*b*1 transmits a network performance test response to pod 150*bn*. Then, at step S302, pod 150*bn* transmits an application and network KPI response to TRO 30.

In the cluster and application resource analysis phase (Block S108, FIG. 4), the Tenant Resource Optimizer process the TRO is responsible for analyzing available compute resources in each cluster in the network as well as to detecting any significant improvement/degradation in tenant application performance, such as tenant application performance degradation due to current node capacity, pod capacity, and/or container capacity. The analysis includes running an off-line version of a scheduler, such as a kube-scheduler, to find tenant pods that would benefit from possible reconfiguration and/or placement on a different node in the same cluster or in a different cluster.

FIG. 11 shows an example process performed in the cluster and application resource analysis phase when a TRO is dedicated to a single tenant. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120.

The process includes collecting and analyzing (Block S304) node, pod, container and application performance with current pod placement. The process further includes determining (Block S306) available compute resources for each node, e.g., a k8s node, in a cluster, e.g., k8s cluster, and a network performance between clusters, such as an IP network performance. The process also includes executing (Block S308) an off-line kube-scheduler and determining scenarios that could provide an overall adjustment in application performance and a node resource utilization, such as k8s node resource utilization. In addition, the process includes finding (Block S310) tenant pods that are candidates for at least one of a possible re-configuration and a placement on a different node in one of a same cluster and a different cluster.

Figure 12:
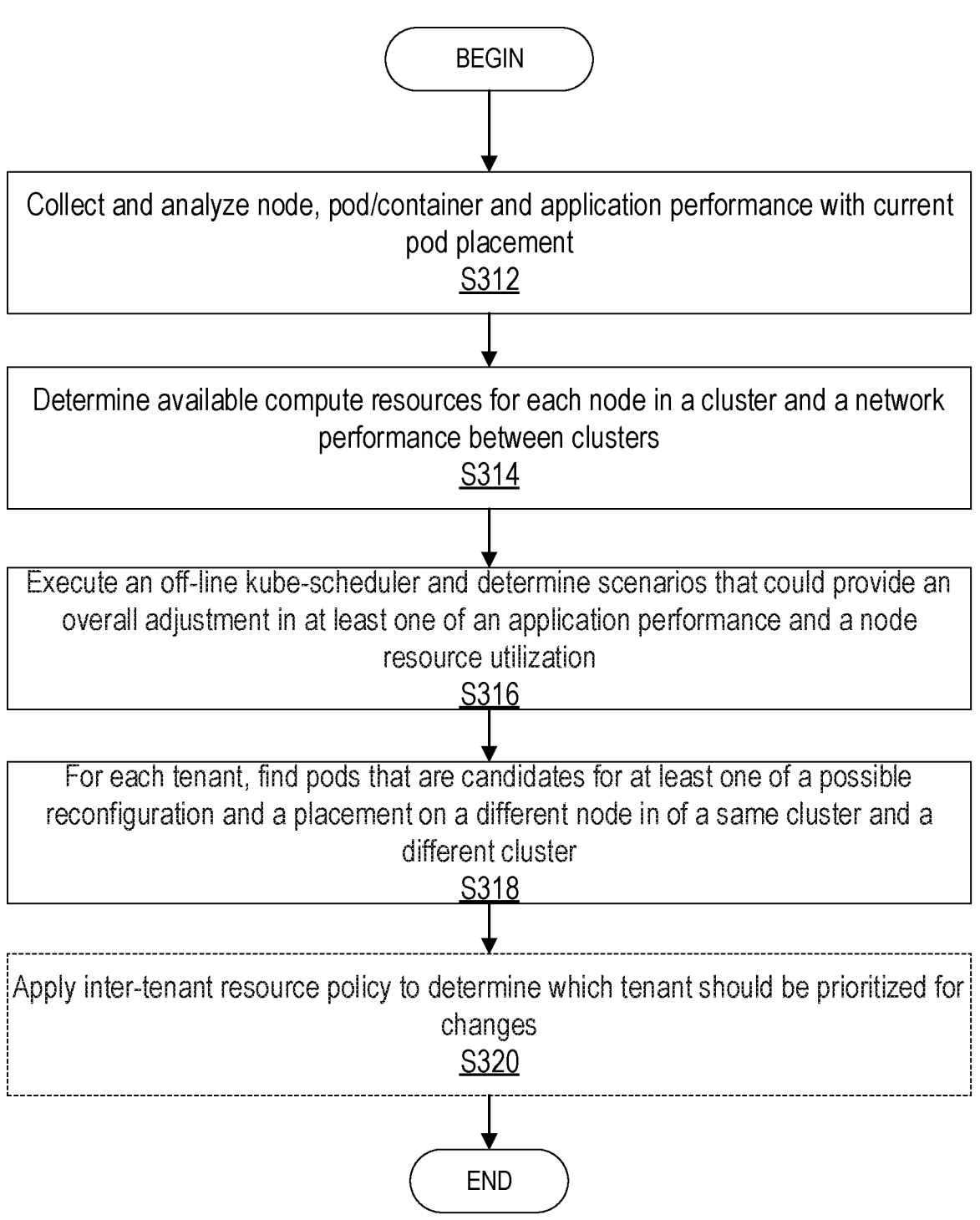
FIG. 12 shows an example process performed in a cluster and application resource analysis phase when a TRO is shared by multiple tenants according to the principles of the present disclosure.

FIG. 12 shows an example process performed in the cluster and application resource analysis phase when a TRO is shared by multiple tenants. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120.

The process includes collecting and analyzing (Block S312) node, pod, container and application performance with current pod placement. The process further includes determining (Block S314) available compute resources for each node, e.g., a k8s node, in a cluster, e.g., k8s cluster, and a network performance between clusters. The process also includes executing (Block S316) an off-line kube-scheduler and determining scenarios that could provide an overall adjustment in an application performance and a node resource utilization, such as k8s node resource utilization. In addition, the process includes, for each tenant, finding (Block S318) tenant pods that are candidates for at least one of a possible re-configuration and a placement on a different node in one of a same cluster and a different cluster. The process further includes optionally applying (Block S320) an inter-tenant resource policy to determine which tenant should be prioritized for changes.

In the application resource optimization phase (Block S110, FIG. 4) the TRO is responsible for performing adjustment actions, e.g., optimization actions, on clusters related to tenant applications. The adjustment actions include applying changes to the clusters using workload lifecycle operations to achieve desired objectives from the analytical phase including application-level preparation and post-optimization tasks to minimize impact on user sessions and user data delivery during the changes.

Possible changes performed by the TRO on the clusters are as follows:

Reconfiguration of a running pod (e.g., increase container CPU or memory allocation);

Eviction of an existing pod in an attempt to move the pod to a new node in the same cluster; and instantiation of a new pod in a different cluster and termination of an existing pod in a previous cluster.

Figure 13:
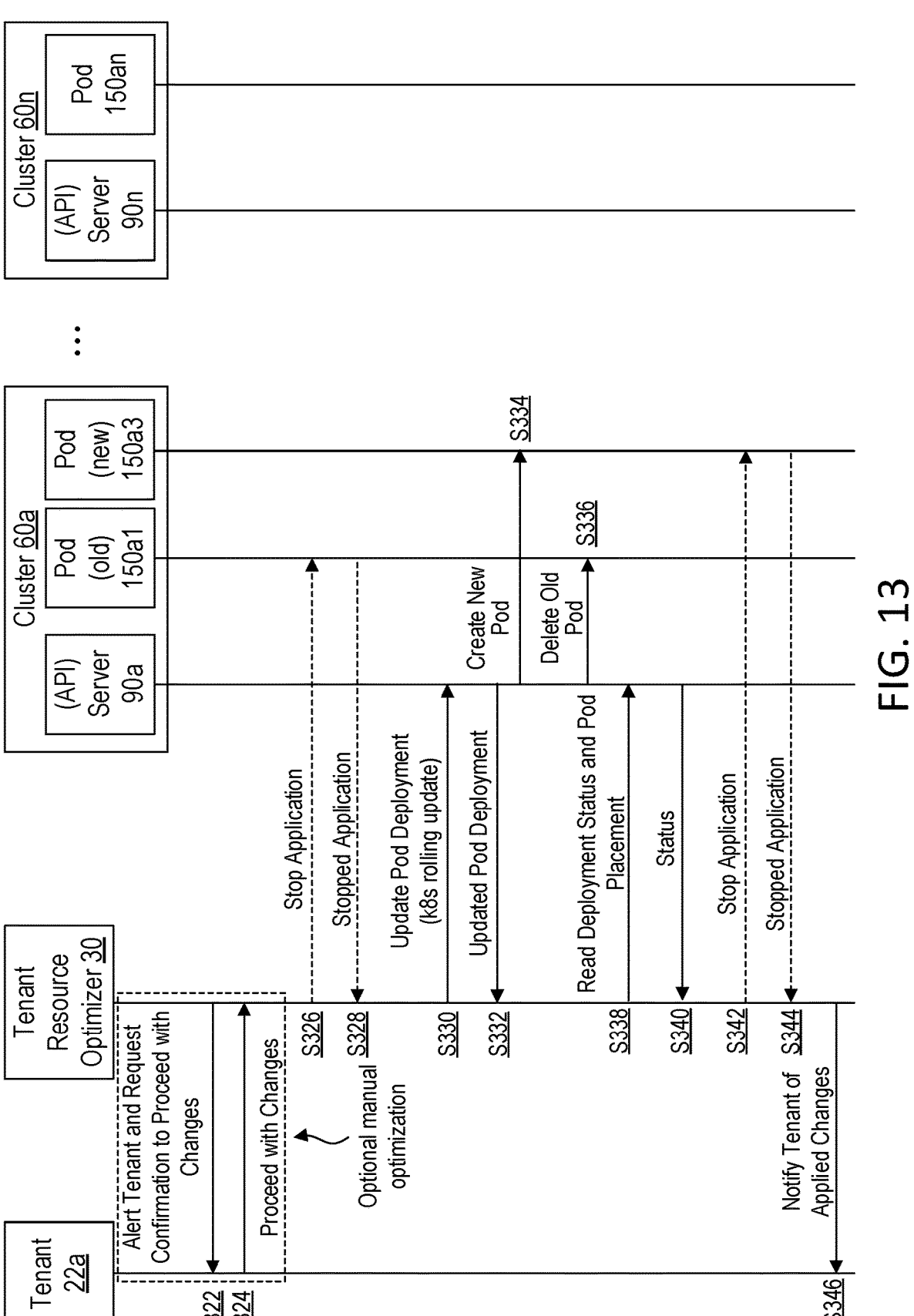
FIG. 13 illustrates an example process performed in an application resource optimization phase when the TRO is dedicated to a single tenant and an applied change includes creating a new pod in the same cluster according to the principles of the present disclosure.

FIG. 13 illustrates an example process performed in the application resource optimization phase when the TRO is dedicated to a single tenant and an applied change includes creating a new pod in the same cluster. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120.

At step S322, optionally, TRO 30 alerts tenant 22 that changes are available, such as changes obtained from the analytical phase, and requests confirmation to proceed with the available changes. At step S324, tenant 22a optionally communicates to the TRO 30 that tenant 22a approves the changes. At step S326, TRO 30 optionally transmits a request to pod 150a1 in cluster 60a to stop an application. At step S328, pod 150a1 optionally responds to TRO 30 that the application has been stopped. At step S330, TRO 30 transmits an update pod deployment to server 90a, e.g., an API server, and, at step S332, the server 90a responds confirming the updated pod deployment. At step S334, server 90a creates a new pod 150a3, and, at Step S336, deletes old pod 150a1.

At step S338, TRO 30 transmits a command to read deployment status and pod placement to server 90a, and, at step S340, a status is provided by server 90a. Optionally, at Step 342, TRO 30 may request stop an application associated with pod 150a3, which may be confirmed by pod 150a3 at step S344. At step S346, TRO 30 notifies tenant of applied changes.

Figure 14:
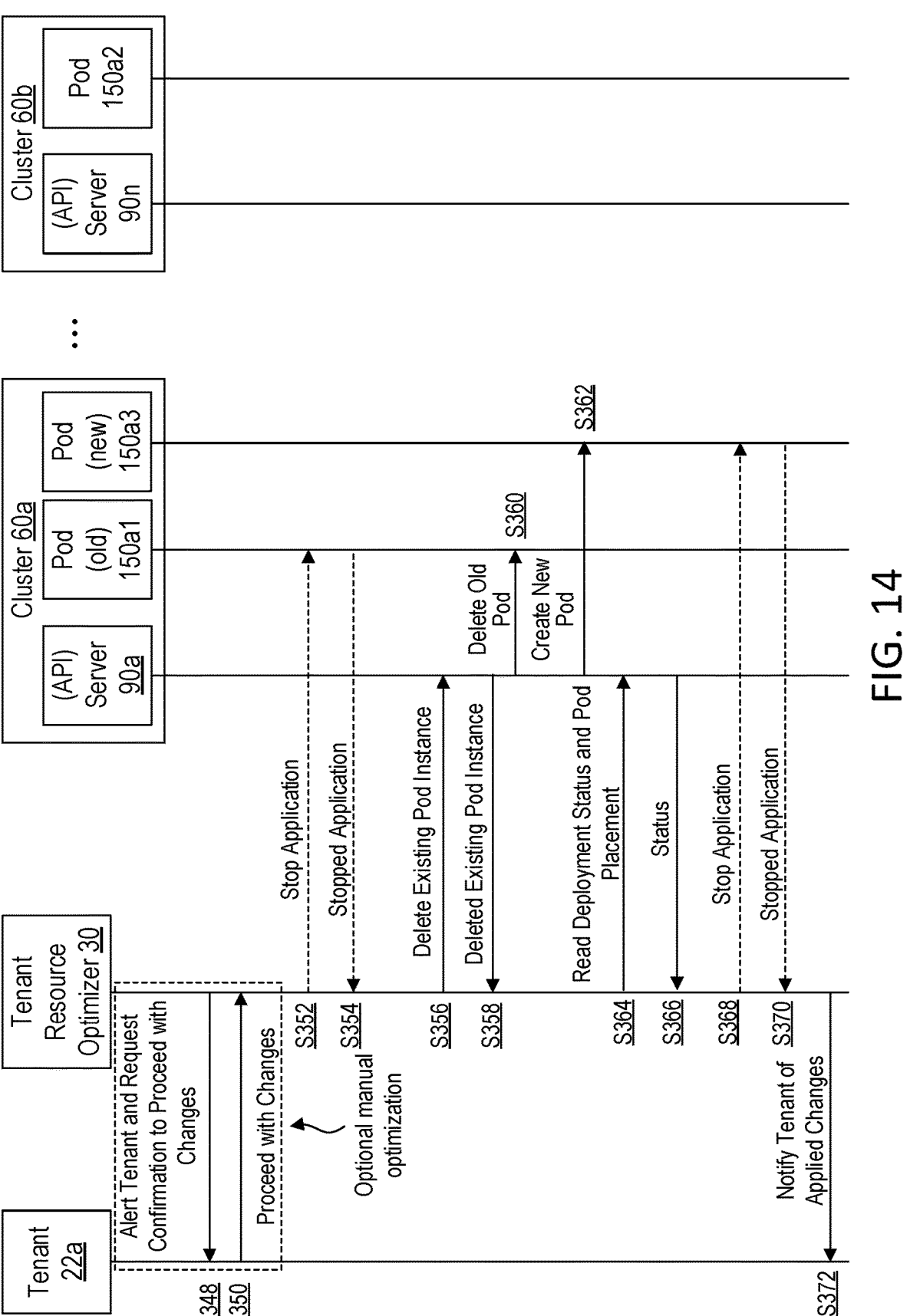
FIG. 14 illustrates an example process performed in an application resource optimization phase when the TRO is dedicated to a single tenant and an applied change includes a pod eviction within the same cluster according to the principles of the present disclosure.

FIG. 14 illustrates an example process performed in the application resource optimization phase when the TRO is dedicated to a single tenant and an applied change includes a pod eviction within the same cluster. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120. At step S348, optionally, TRO 30 alerts tenant 22 that changes are available, such as changes obtained from the analytical phase, and requests confirmation to proceed with the available changes. At step S350, tenant 22a optionally communicates to the TRO 30 that tenant 22a approves the changes. At step S352, TRO 30 optionally transmits a request to pod 150a1 in cluster 60a to stop an application. At step S354, pod 150a1 optionally responds to TRO 30 that the application has been stopped. At step S356, TRO 30 transmits a request to server 90a, e.g., an API server, to delete an existing pod instance, and, at step S358, the server 90a responds confirming the receipt of the request to delete the existing pod instance. At step S360, server 90a deletes old pod 150a1, and, at Step S362, creates new pod 150a3.

At step S364, TRO 30 transmits a command to read deployment status and pod placement to server 90a, and, at step S366, a status is provided by server 90a. Optionally, at step S338, TRO 30 may request stop an application associated with pod 150a3, which may be confirmed by pod 150a3 at step S370. At step S372, TRO 30 notifies tenant of applied changes.

Figure 15:
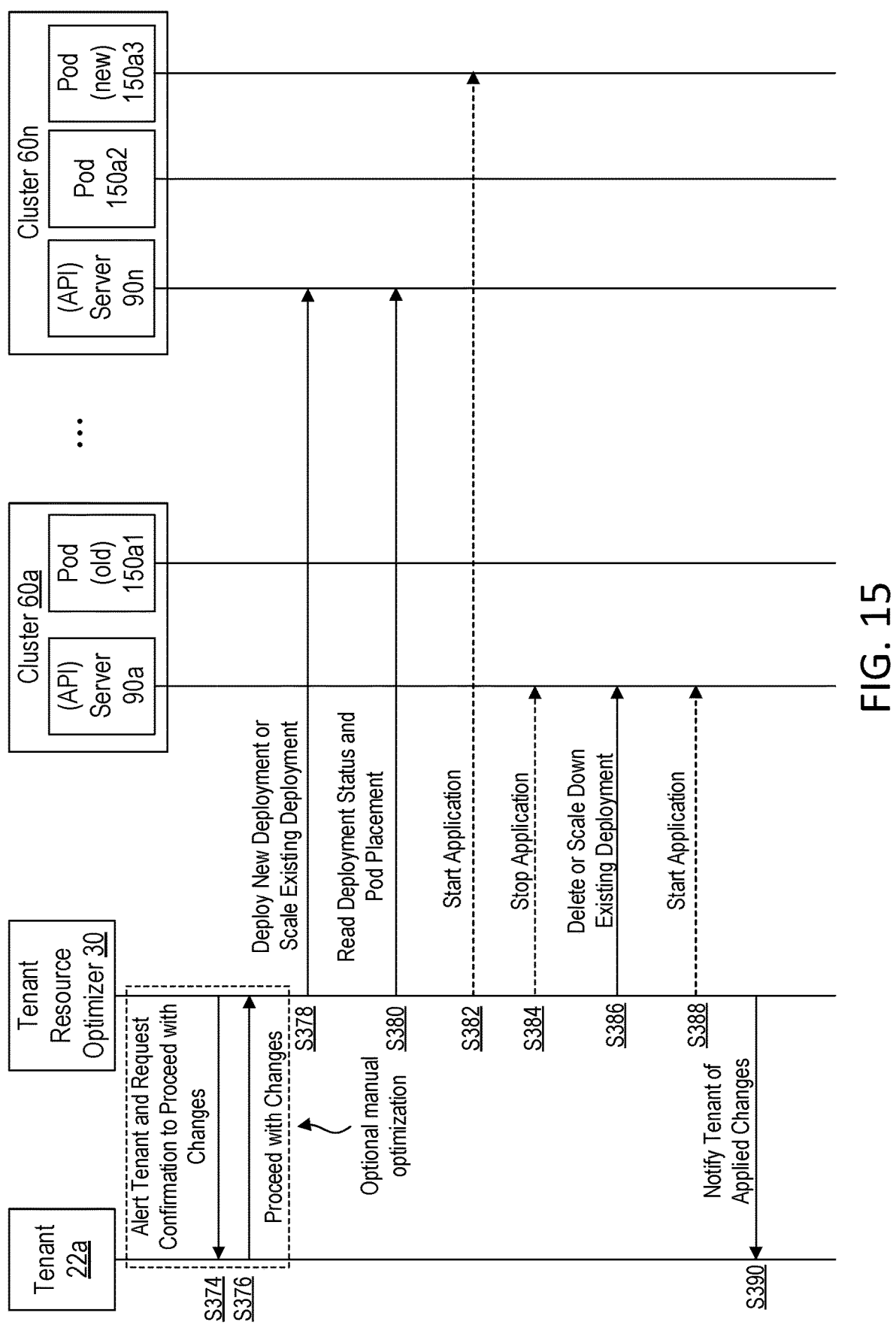
FIG. 15 illustrates an example process performed in an application resource optimization phase when the TRO is dedicated to a single tenant and an applied change includes evicting a pod to a different cluster according to the principles of the present disclosure.

FIG. 15 illustrates an example process performed in the application resource optimization phase when the TRO is dedicated to a single tenant and an applied change includes evicting a pod to a different cluster. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120.

At step S374, optionally, TRO 30 alerts tenant 22 that changes are available, such as changes obtained from the analytical phase, and requests confirmation to proceed with the available changes. At step S376, tenant 22a optionally communicates to the TRO 30 that tenant 22a approves the changes. At step S378, TRO 30 may request server 90n, e.g., an API server, to perform a new deployment or to scale a new deployment. At step S380, TRO 30 transmits a request to server 90n to read deployment status and pod placement. Optionally, at step S382, a request to start an application may be transmitted from TRO 30 to a new pod 150a3 in cluster 60n. At step S384, TRO 30 may transmit a request to server 90a in cluster 60a to stop an application. At step S386, a request to delete or scale down an existing deployment is transmitted from TRO 30 to server 90a. TRO 30 may also request server 90a to start an application. Further, TRO 30 notifies tenant 22a of applied changes in step S390.

Figure 16:
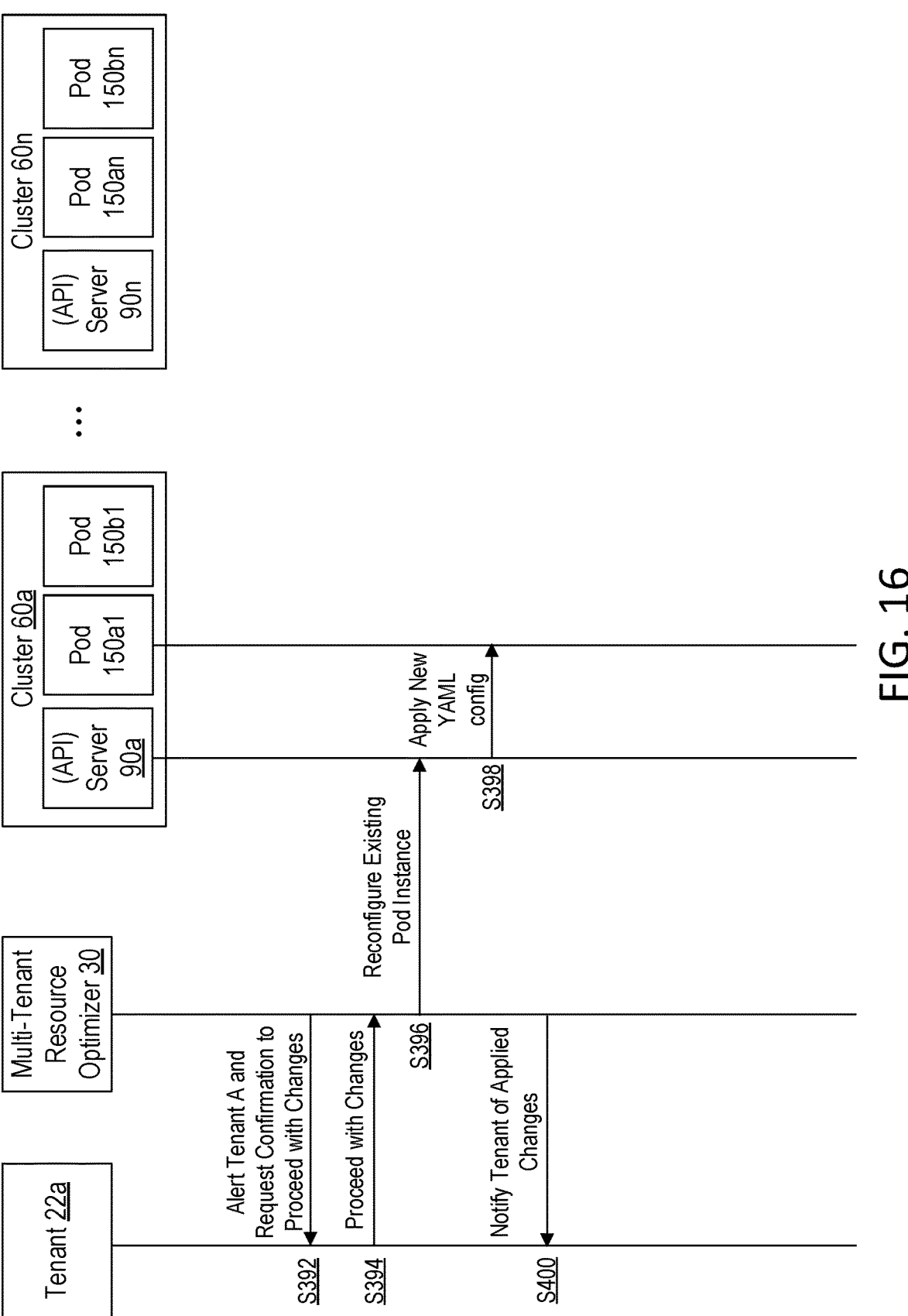
FIG. 16 shows an example process performed in an application resource optimization phase when the TRO is dedicated to a single tenant and an applied change is a pod reconfiguration.

FIG. 16 shows an example process performed in the application resource optimization phase when the TRO is dedicated to a single tenant and an applied change is a pod reconfiguration. One or more Blocks and/or functions and/or methods performed in this example may be performed by one or more elements of Tenant Resource Optimizer 30 such as via tenant resource control unit 32 in processing circuitry 44, processor 46, communication interface 42, etc. according to the example method. Similarly, one or more Blocks and/or functions and/or methods performed in this example may be performed by one or more elements of cluster 60, server 90, and/or node 120.

At step S392, TRO 30 alerts tenant 22a that changes are available, such as changes obtained from the analytical phase, and requests confirmation to proceed with the available changes. At step S394, tenant 22a communicates to the TRO 30 that tenant 22a approves the changes. At step S396, a request is transmitted from TRO 30 to server 90a, e.g., an API server, to reconfigure an existing pod instance. At step S398, server 90a applies the reconfiguration of an existing pod instance, such as by applying a new YAML configuration to pod 150a1. At step S400, TRO 30 notifies tenant 22a of applied changes.

The following is a nonlimiting list of exemplary embodiments of the present disclosure:

1. An embodiment for a method for tenant resource optimizing in a container-based environment, the container-based environment having one or more pods, one or more clusters and one or more nodes, the method comprising:
   utilizing a tenant resource optimizer (TRO) to analyze the performance of applications within the system and the capacity of any multi-cluster networks running in a container within the environment to find pods within the container have could belong to a tenant that could benefit from re-configuration, re-scheduling in the same cluster or re-scheduling in a different cluster.
2. The method of embodiment 1, wherein the TRO is utilized to influence or control the placement of pod runtime instances across one or more clusters providing different resource capability and capacity over time.
3. The method of any of embodiments 1-2, wherein the TRO is utilized to discover the capability and capacity of each cluster and application performance with current pod placement.
4. The method of any of embodiments 1-3, wherein the TRO is utilized to detect improvement or degradation in application performance due to current pod placement and running an offline version of an intra-cluster pod scheduler to find pod instances that would benefit from re-configuration, re-scheduling in the same cluster or re-scheduling in a different cluster.
5. The method of any of embodiments 1-4, wherein the TRO is utilized to include using workload lifecycle operations for achieving the new pod placement and/or configuration with application-layer preparation and post-optimization tasks needed to minimize impact on user sessions and user data delivery during the changes.
6. An embodiment for a method for tenant resource optimizing, the method comprising:
   discovering and collecting cluster capacity and application performance information in a multi-cluster network;
   analyzing available compute resources in each cluster in the network as well as to detecting any significant improvement/degradation in tenant application performance due to current node/pod/container capacity; and
   performing optimization actions on the clusters related to the tenant applications.
7. The method of embodiment 6, further comprising applying any changes to the cluster(s) and related tenant pods.
8. The method of embodiment 7, further comprising repeating the steps of discovering, analyzing and performing.
9. The method of embodiment 8, wherein the rate at which each repeating of the steps is user configurable.
10. A computer program comprising instructions which, when executed by at least one processor and to perform by the at least one processor the method of any of embodiments 1-9.
11. A system for tenant resource optimization, the system comprising:
   one or more processors; and
   memory storing instructions that, when executed by the one or more processors, cause the system to:
   perform the method set out in any of the embodiments 1-9.
12. A non-transitory computer readable medium comprising instructions that, when executed, cause one or more processors to:
   perform the method set out in any of the embodiments 1-9.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of using a multi-cluster network, the multi-cluster network having at least a plurality of clusters, each cluster of the plurality of clusters having at least a node and a pod, the method comprising:
    collecting cluster and application information of the multi-cluster network, the cluster and application information including at least a cluster capacity and an application performance metric, the application performance metric corresponding to at least an application;
    analyzing the cluster and application information for a current pod arrangement on each cluster; and
    adjusting at least the application performance metric based at least on the analyzed cluster and application information by taking at least a pod-based action achieving a new pod arrangement on a target cluster,
    wherein adjusting at least the application performance metric further includes evicting an existing pod from a node where the existing pod runs,
    wherein evicting the existing pod further includes performing a new pod deployment including:
        updating, with a pod deployment template, a server of a cluster associated with the existing pod;
        creating a new pod;
        deleting the existing pod; and
        obtaining a deployment status corresponding to the pod deployment template.

2. The method of claim 1, wherein the cluster capacity and application performance metric includes at least one of:
    a cluster performance metric associated with nodes, pods, and volumes, each of the volumes corresponding to one pod;
    radio access network, RAN, application key performance metrics, KPIs, including at least one of a number of connected users, a downlink cell volume, an uplink cell volume, an average user throughput, and a call setup delay; and
    internet protocol, IP, throughput measurements.

3. The method of claim 1, wherein analyzing the cluster and application information further includes:
    determining available compute resources for each node in each cluster of the multi-cluster network and a network performance between each cluster of the multi-cluster network;
    determining a reconfiguration scenario using at least an off-line scheduler to adjust at least one of the application performance metric and a node resource utilization;
    determining at least a candidate pod for one of a possible reconfiguration and a placement of a pod on a different node, the different node being in one of a same cluster or in a different cluster; and
    wherein adjusting at least the application performance metric further includes at least one of:
        reconfiguring an existing pod;
        instantiating a new pod; and
        performing rolling updates by incrementally updating pods with new pods, the new pods being scheduled on nodes with available compute resources.

4. An apparatus for using a multi-cluster network, the multi-cluster network having at least a plurality of clusters, each cluster of the plurality of clusters having at least a node and a pod, the apparatus comprising:

processing circuitry, the processing circuitry being configured to:

collect cluster and application information of the multi-cluster network, the cluster and application information including at least a cluster capacity and an application performance metric, the application performance metric corresponding to at least an application;

analyze the cluster and application information for a current pod arrangement on each cluster; and adjust at least the application performance metric based at least on the analyzed cluster and application information by taking at least a pod-based action achieving a new pod arrangement on a target cluster, wherein adjusting at least the application performance metric further includes evicting an existing pod from a node where the existing pod runs, wherein evicting the existing pod further includes performing a new pod deployment including:

updating, with a pod deployment template, a server of a cluster associated with the existing pod;

creating a new pod;

deleting the existing pod; and obtaining a deployment status corresponding to the pod deployment template.

5. The apparatus of claim 4, wherein the cluster capacity and application performance metric includes at least one of:

a cluster performance metric associated with nodes, pods, and volumes, each of the volumes corresponding to one pod;

radio access network, RAN, application key performance metrics, KPIs, including at least one of a number of connected users, a downlink cell volume, an uplink cell volume, an average user throughput, and a call setup delay; and internet protocol, IP, throughput measurements.

6. The apparatus of claim 4, wherein the multi-cluster network includes at least a first cluster and a second cluster, the first cluster including at least a first server and a first plurality of pods, the second cluster including a second server and a second plurality of pods.

7. The apparatus of claim 6, wherein the first server includes at least any one of a first application programming interface, API, server and a first Prometheus server, and the second server includes at least any one of a second application programming interface, API, server and a second Prometheus server, the first and second Prometheus servers being configured to at least collect and provide data including data associated with a cluster and a radio access network, RAN, performance and with a resource usage for the current pod arrangement.

8. The apparatus of claim 6, wherein collecting cluster and application information of the multi-cluster network further includes:

transmitting a first cluster resource audit request to the first server of the first cluster;

receiving a first cluster resource audit response from the first server of the first cluster based at least on the first cluster resource audit request;

transmitting a second cluster resource audit request to the second server of the second cluster; and receiving a second cluster resource audit response from the second server of the second cluster based at least on the second cluster resource audit request.

9. The apparatus of claim 6, wherein collecting cluster and application information of the multi-cluster network further includes:

transmitting a first application key parameter indicator, KPI, request to one of the first server of the first cluster and a pod of the first plurality of pods;

receiving a first application KPI response from one of the first server of the first cluster and the pod of the first plurality of pods based at least on the first application KPI request;

transmitting a second application key parameter indicator, KPI, request to one of the second server of the second cluster and a pod of the second plurality of pods; and receiving a second application KPI response from one of the second server of the second cluster and the pod of the second plurality of pods based at least on the second application KPI request.

10. The apparatus of claim 9, wherein collecting cluster and application information of the multi-cluster network further includes:

transmitting a first network KPI request to the pod of the first plurality of pods;

receiving a first network KPI response from the pod of the first plurality of pods based at least on the first network KPI request;

transmitting a second network KPI request to the pod of the second plurality of pods; and receiving a second network KPI response from the pod of the second plurality of pods based at least on the second network KPI request.

11. The apparatus of claim 10, wherein transmitting the first network KPI requests includes:

performing a first network test from the pod of the first plurality of pods to the pod of the second plurality of pods; and transmitting the second network KPI request includes:

performing a second network test from the pod of the second plurality of pods to the pod of the first plurality of pods.

12. The apparatus of claim 9, wherein the pod of the first plurality of pods is one of a first pod of the first plurality of pods and a second pod of the first plurality of pods;

the pod of the second plurality of pods is one of first pod of the second plurality of pods and a second pod of the second plurality of pods;

the first pod of the first plurality of pods and the first pod of the second plurality of pods being associated with a first tenant; and the second pod of the first plurality of pods and the second pod of the second plurality of pods being associated with a second tenant.

13. The apparatus of claim 4, wherein analyzing the cluster and application information further includes:

determining available compute resources for each node in each cluster of the multi-cluster network and a network performance between each cluster of the multi-cluster network;

determining a reconfiguration scenario using at least an off-line scheduler to adjust at least one of the application performance metric and a node resource utilization; and determining at least a candidate pod for one of a possible reconfiguration and a placement of a pod on a different node, the different node being in one of a same cluster or in a different cluster.

14. The apparatus of claim 13, wherein the processing circuitry is further configured to:

apply an inter-tenant resource policy; and determine a priority for each change associated with a tenant based at least on the inter-tenant resource policy.

15. The apparatus of claim 4, wherein adjusting at least the application performance metric further includes at least one of:

reconfiguring an existing pod; and instantiating a new pod.

16. The apparatus of claim 15, wherein reconfiguring an existing pod further includes applying a new pod configuration to the existing pod to adjust at least a pod performance metric.

17. The apparatus of claim 15, wherein instantiating a new pod includes:

performing one of a new pod deployment and a scaled pod deployment in a cluster different from the cluster of the existing pod;

obtaining a deployment status corresponding to one of the new pod deployment and the scaled pod deployment; and performing one of:

deleting an existing deployment associated with the existing pod; and scaling down the existing deployment associated with the existing pod.

18. The apparatus of claim 4, wherein adjusting at least the application performance metric further includes:

performing rolling updates by incrementally updating pods with new pods, the new pods being scheduled on nodes with available compute resources.

19. The apparatus of claim 4, wherein the apparatus is configured to operate as one of:

a standalone network device;

part of a virtual network function manager, VNFM;

part of an open network automation platform, ONAP; and part of an open radio access network, O-RAN, near-real time radio intelligence controller, RIC, with an interface to clusters.

20. An apparatus for using a multi-cluster network, the multi-cluster network having at least a plurality of clusters, each cluster of the plurality of clusters having at least a node and a pod, the apparatus comprising:

processing circuitry, the processing circuitry being configured to:

collect cluster and application information of the multi-cluster network, the cluster and application information including at least a cluster capacity and an application performance metric, the application performance metric corresponding to at least an application;

analyze the cluster and application information for a current pod arrangement on each cluster; and adjust at least the application performance metric based at least on the analyzed cluster and application information by taking at least a pod-based action achieving a new pod arrangement on a target cluster, wherein the multi-cluster network includes at least a first cluster and a second cluster, the first cluster including at least a first server and a first plurality of pods, the second cluster including a second server and a second plurality of pods, wherein collecting cluster and application information of the multi-cluster network further includes:

transmitting a first application key parameter indicator, KPI, request to one of the first server of the first cluster and a pod of the first plurality of pods;

receiving a first application KPI response from one of the first server of the first cluster and the pod of the first plurality of pods based at least on the first application KPI request;

transmitting a second application key parameter indicator, KPI, request to one of the second server of the second cluster and a pod of the second plurality of pods; and receiving a second application KPI response from one of the second server of the second cluster and the pod of the second plurality of pods based at least on the second application KPI request, wherein collecting cluster and application information of the multi-cluster network further includes:

transmitting a first network KPI request to the pod of the first plurality of pods;

receiving a first network KPI response from the pod of the first plurality of pods based at least on the first network KPI request;

transmitting a second network KPI request to the pod of the second plurality of pods; and receiving a second network KPI response from the pod of the second plurality of pods based at least on the second network KPI request, and wherein transmitting the first network KPI requests includes:

performing a first network test from the pod of the first plurality of pods to the pod of the second plurality of pods; and transmitting the second network KPI request includes:

performing a second network test from the pod of the second plurality of pods to the pod of the first plurality of pods.

* * * * *